United States Patent
Zhang et al.

(10) Patent No.: US 10,924,590 B1
(45) Date of Patent: Feb. 16, 2021

(54) VIRTUAL WORKSPACE EXPERIENCE VISUALIZATION AND OPTIMIZATION

(71) Applicant: Citrix Systems, Inc., Ft. Lauderdale, FL (US)

(72) Inventors: Xiao Zhang, Nanjing (CN); Ze Chen, Nanjing (CN); Tao Zhan, Nanjing (CN); Bo Chen, Nanjing (CN)

(73) Assignee: Citrix Systems, Inc., Ft, Lauderdale, FL (US)

( * ) Notice: Subject to any disclaimer, the term of this patent is extended or adjusted under 35 U.S.C. 154(b) by 0 days.

(21) Appl. No.: 16/793,373

(22) Filed: Feb. 18, 2020

Related U.S. Application Data

(63) Continuation of application No. PCT/CN2019/127047, filed on Dec. 20, 2019.

(51) Int. Cl.
*H04L 29/08* (2006.01)
*H04L 12/919* (2013.01)
*G06N 20/00* (2019.01)

(52) U.S. Cl.
CPC ............. *H04L 67/34* (2013.01); *G06N 20/00* (2019.01); *H04L 47/765* (2013.01)

(58) Field of Classification Search
CPC ........ H04L 67/34; H04L 47/765; G06N 20/00
See application file for complete search history.

(56) References Cited

U.S. PATENT DOCUMENTS

| | | | |
|---|---|---|---|
| 6,513,155 B1 * | 1/2003 | Alexander, III | G06F 11/3409 717/124 |
| 6,904,594 B1 * | 6/2005 | Berry | G06F 11/3404 717/130 |
| 7,734,775 B2 | 6/2010 | Barnett et al. | |
| 10,706,028 B2 * | 7/2020 | Baradaran | G06F 11/3082 |
| 2011/0276396 A1 * | 11/2011 | Rathod | H04L 51/066 705/14.49 |
| 2013/0103764 A1 * | 4/2013 | Verkasalo | G06N 20/00 709/204 |

(Continued)

FOREIGN PATENT DOCUMENTS

| | | |
|---|---|---|
| CN | 104331375 A | 4/2015 |
| CN | 108900366 A | 11/2018 |
| CN | 109213555 A | 1/2019 |

OTHER PUBLICATIONS

International Search Report for Application No. PCT/CN2019/127047 dated Sep. 9, 2020, 5 pages.

(Continued)

*Primary Examiner* — Michael Won
(74) *Attorney, Agent, or Firm* — Finch & Maloney PLLC

(57) ABSTRACT

A computer system to track and enhance performance of a virtual workspace system is provided. The computer system receives requests to profile phases of a distributed process executed by hosts coupled to one another via a network. Each of phase includes operations executed by processes hosted by the hosts. Each of phase either starts with receipt of a request via a user interface of a virtualization client or ends with provision of a response to the request via the user interface. The computer system identifies event log entries that each include an identifier of an event marking a start or an end of one of the operations, constructs a performance profile based on the event log entries, and transmits the performance profile to the user interface.

14 Claims, 16 Drawing Sheets

(56) References Cited

U.S. PATENT DOCUMENTS

2018/0276256 A1\* 9/2018 Sarkar .................... G06N 20/00
2019/0377731 A1 12/2019 Kent, IV et al.
2020/0065342 A1\* 2/2020 Panuganty .......... G06F 16/9535

OTHER PUBLICATIONS

International Written Opinion (Corrected) for Application No. PCT/CN2019/127047 dated Oct. 19, 2020, 4 pages.

\* cited by examiner

VIRTUAL WORKSPACE EXPERIENCE VISUALIZATION AND OPTIMIZATION

CROSS-REFERENCE TO RELATED APPLICATIONS

This application claims the benefit under 35 U.S.C. § 120 as a continuation of PCT application no. PCT/CN2019/127047, titled "VIRTUAL WORKSPACE EXPERIENCE VISUALIZATION AND OPTIMIZATION," filed on Dec. 20, 2019, which designates the United States. The aforementioned application is hereby incorporated herein by reference in its entirety.

BACKGROUND

Virtual workspace systems are complex and include a variety of hardware and software components that collectively provide users with high performance, secure execution environments. Some installations involve both on-premises systems and multi-tenant, cloud-based systems that interoperate to service user requests. These user requests can include requests to execute virtual resources such as virtual applications, virtual desktops, and virtual servers. When operating efficiently, virtual workspace systems provide users with powerful and responsive computing resources that are accessible via a wide variety of computing devices, thus enabling these users to work from virtually any geographic location.

SUMMARY

In at least one example, a computer system in provided. The computer system includes a memory, at least one network interface, and at least one processor coupled to the memory and the at least one network interface. The memory stores a plurality of event log entries. Each event log entry of the plurality of event log entries includes an identifier of an event and a timestamp at which the event occurred. The at least one processor is configured to receive, via the at least one network interface, a request to profile one or more phases of a distributed process executed by a plurality of hosts coupled to one another via a network, each of the one or more phases comprising a plurality of operations executed by a plurality of processes hosted by the plurality of hosts, each of the one or more phases either starting with receipt of a request via a user interface of a virtualization client application or ending with provision of a response to the request via the user interface of the virtualization client application, identify two or more event log entries within the plurality of event log entries that each include an identifier of an event marking one or more of a start and an end of one of the plurality of operations, construct a performance profile based on the two or more event log entries, and transmit the performance profile to the virtualization client application for rendering via the user interface of the virtualization client application.

At least some examples of the computer system can include one or more of the following features. In the computer system, the one or more phases can include a virtual resource enumeration phase. The plurality of processes can include the virtualization client application and a virtual resource broker. To identify the two or more event log entries can include to identify a first event log entry marking reception of input via the user interface requesting a list of one or more virtual resources accessible via the virtualization client application and a second event log entry marking rendering of the list via the user interface.

In the computer system, the one or more phases can include a virtual resource allocation phase and a virtual resource connection phase. The plurality of processes can include the virtualization client application, the virtual resource broker, and a virtualization agent. To identify the two or more event log entries can include to identify a first event log entry marking reception of input via the user interface requesting access to at least one virtual resource in the list and a second event log entry marking rendering of a representation of the at least one virtual resource via the user interface. The at least one virtual resource can include one or more of a virtual desktop, a virtual application, and virtual data storage.

In the computer system, the one or more phases can include a virtual resource allocation phase and a virtual resource connection phase. The plurality of processes can include the virtualization client application, a gateway service, an identity provisioning service, a content switching service, a connection service, and a virtualization agent. To identify the two or more event log entries can include to identify a first event log entry marking reception of input via the user interface requesting access to at least one virtual resource in the list, the at least one virtual resource being hosted by a multi-tenant cloud service and a second event log entry marking rendering of a representation of the at least one virtual resource via the user interface.

In the computer system, the at least one processor can be further configured to display a visualization of the performance profile via the user interface. The visualization can include an indication of a difference between timestamps stored in the two or more event log entries. The at least one processor can be further configured to display a visualization of the performance profile via the user interface. The visualization can include a list of durations of execution of each operation of the plurality of operations. The at least one processor can be further configured to display a visualization of the performance profile via the user interface. The visualization can include a list of durations of execution of each of the one or more phases. The at least one processor can be further configured to receive a request to improve performance of at least one process of the plurality of processes, identify at least one enhancement available for the at least one process, and initiate deployment of the at least one enhancement to the at least one process.

In the computer system, the memory can store parameters of a machine learning process trained to identify the at least one enhancement by processing features descriptive of a virtual workspace system comprising the virtualization client application. To identify the at least one enhancement can include to execute the machine learning process using the parameters and the features. The at least one process can include the virtualization client application, the at least one enhancement can include a template of configuration information. To initiate deployment of the at least one enhancement can include to replace configuration information of the virtualization client application with the template. The at least one processor can be further configured to display, via the user interface, a confirmation of the deployment of the at least one enhancement.

In the computer system, the at least one process can include one or more of a virtualization agent and a connection service. The at least one enhancement can include a template of configuration information. To initiate deployment of the at least one enhancement can include to transmit a notification to an administrator of the virtualization agent or the connection service. The notification can include a prompt to the administrator to replace configuration information of the one or more of the virtualization agent and the connection service with the template.

In the computer system, the at least one process can include one or more of a gateway service, an identify provision service, a content switching service, a virtual workspace service, and a content switching service. The at least one enhancement can include one or more of a patch and a cache setting. To initiate deployment of the at least one enhancement can include to transmit a notification to an administrator of the gateway service, the identity provision service, the content switching service, the virtual workspace service, and the content switching service, the notification comprising a prompt to the administrator to deploy one or more of the patch and the cache setting.

In another example, a method of tracking and enhancing performance of a virtual workspace system using a computer system is provided. The computer system includes a memory, at least one network interface, and at least one processor coupled to the memory and the at least one network interface. The memory stores a plurality of event log entries. Each event log entry of the plurality of event log entries includes an identifier of an event and a timestamp at which the event occurred. The method includes acts of receiving, via the at least one network interface, a request to profile one or more phases of a distributed process executed by a plurality of hosts coupled to one another via a network, each of the one or more phases comprising a plurality of operations executed by a plurality of processes hosted by the plurality of hosts, each of the one or more phases either starting with receipt of a request via a user interface of a virtualization client application or ending with provision of a response to the request via the user interface of the virtualization client application; identifying two or more event log entries within the plurality of event log entries that each include an identifier of an event marking one or more of a start and an end of one of the plurality of operations; constructing a performance profile based on the two or more event log entries; and transmitting the performance profile to the virtualization client application for rendering via the user interface of the virtualization client application.

At least some examples of the method can include one or more of the following features. The method can further include acts of receiving a request to improve performance of at least one process of the plurality of processes, identifying at least one enhancement available for the at least one process, and initiating deployment of the at least one enhancement to the at least one process. In the method, the at least one process can include the virtualization client application. The at least one enhancement can include a template of configuration information. Initiating deployment of the at least one enhancement can include replacing configuration information of the virtualization client application with the template.

In another example, a non-transitory computer readable medium is provided. The computer readable medium stores processor executable instructions to track and enhance performance of a virtual workspace system. The instructions include instructions to receive, via at least one network interface, a request to profile one or more phases of a distributed process executed by a plurality of hosts coupled to one another via a network, each of the one or more phases comprising a plurality of operations hosted by the plurality of hosts, each of the one or more phases either starting with receipt of a request via a user interface of a virtualization client application or ending with provision of a response to the request via the user interface of the virtualization client application; identify two or more event log entries within a plurality of event log entries that each include an identifier of an event marking one or more of a start and an end of one of the plurality of operations; construct a performance profile based on the two or more event log entries; and transmit the performance profile to the virtualization client application for rendering via the user interface of the virtualization client application.

At least some examples of the computer readable medium can include one or more of the following features. The instructions can further comprise instructions to receive a request to improve performance of at least one process of the plurality of processes, identify at least one enhancement available for the at least one process, and initiate deployment of the at least one enhancement to the at least one process. In the computer readable medium, the at least one process can include the virtualization client application. The at least one enhancement can include a template of configuration information. The instructions to initiate deployment of the at least one enhancement can include instructions to replace configuration information of the virtualization client application with the template.

Still other aspects, examples and advantages of these aspects and examples, are discussed in detail below. Moreover, it is to be understood that both the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

DETAILED DESCRIPTION

Figure 1:
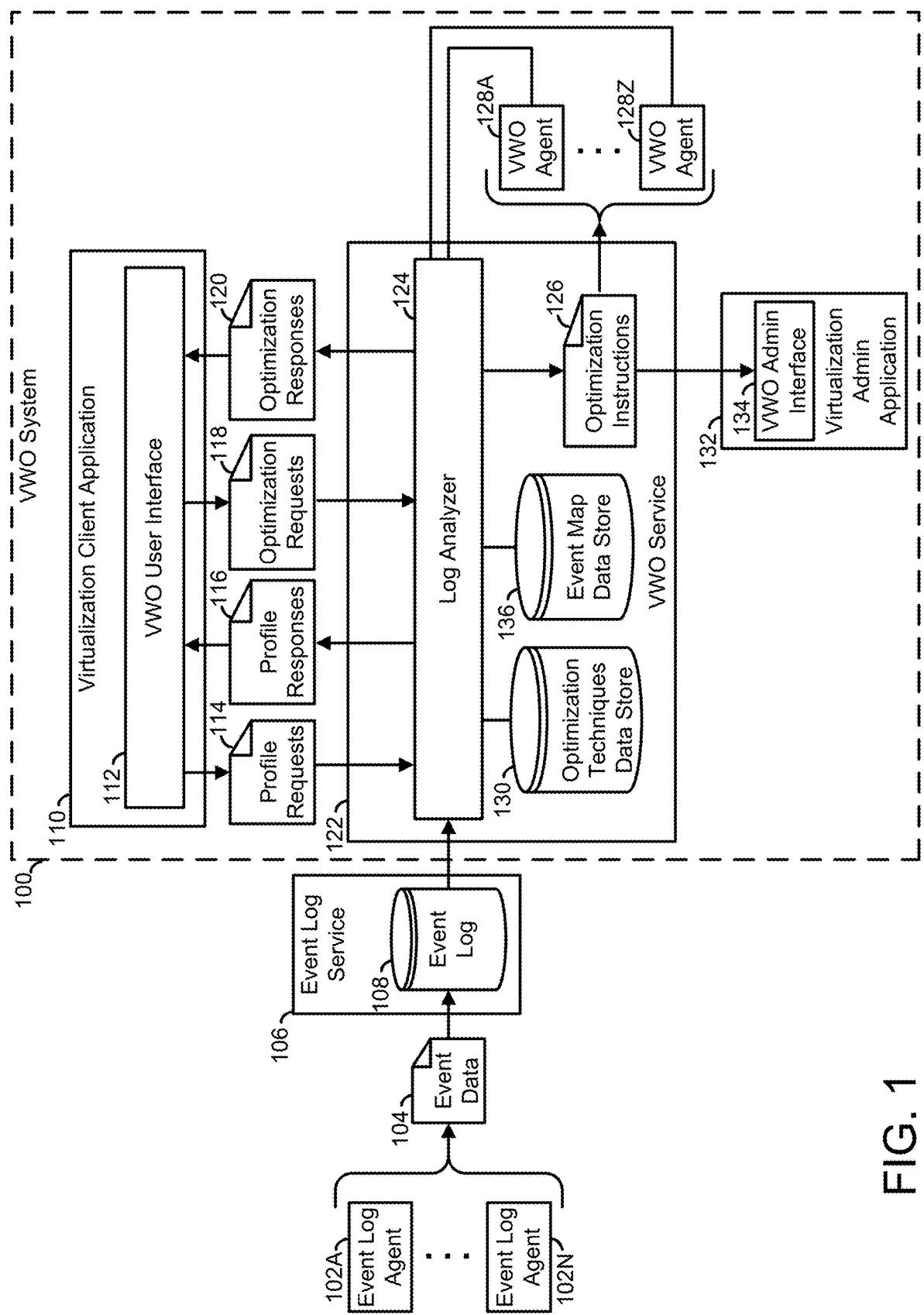
FIG. 1 is a block diagram of a virtual workspace (VW) optimization system in accordance with an example of the present disclosure.

As summarized above, various examples described herein are directed to systems and methods that render visual representations of virtual workspaces and optimize (i.e., improve or enhance) their performance. These systems and methods overcome technical difficulties that arise when characteristics of a distributed computing environment implementing a VW system change and, thereby, degrade the VW system's performance. For instance, even relatively simple VW systems include several distinct physical and logical components that are geographically disperse. These components interoperate (e.g., generate and transmit requests and/or receive and process responses) with one another via a communication network to provide users with virtualized resources. Changes to this computing environment, such as high network or server utilization, physical server failure, additional virtual resource provisioning, and the like, can degrade VW system performance to a point noticeable by users. Such degradation can result in a host of negative outcomes, both for the user and the provider of the VW system.

To address these performance issues and other issues, VWO systems and processes are provided. These systems and processes enable users of VW systems to take an active hand fixing performance issues within a VW system, thereby empowering the users, improving their experience within the VW system, and increasing user satisfaction and retention. In some examples, the VWO systems and processes profile user-interactive phases of execution of a VW system and generate performance data descriptive of the user-interactive phases. The phases profiled by the VWO systems and process can include, for example, virtual resource enumeration, virtual resource allocation and virtual resource connection. The performance data can include durations of operations executed by VW processes during the profiled phases. In at least some examples, the VWO systems and processes render visualizations of the performance data to users and accept, from the users, input to initiate optimizations of targeted VW processes.

In some examples, the VWO systems and processes identify optimizations that depend on the targeted VW process and/or a currently configured optimization mode. For instance, where an optimization mode setting of the VWO systems and processes is set to configuration mode, the VWO systems and processes identify optimizations as templates including configuration settings that can improve performance of a targeted VW process. Alternatively or additionally, where an optimization mode setting of the VWO systems and processes is set to whitelist cache and/or hot patch mode, the VWO systems and processes identify optimization as potential whitelist cache settings and/or hot patches deployable to modify the targeted VW process. It should be appreciated that the optimization mode setting can change based on the VW process targeted for optimization. For instance, where the targeted VW process can affect only the user, the optimization mode setting can be set to configuration mode. However, where the targeted VW process can affect other users within the user's organization and/or users outside the user's organization (e.g., as would be the case for a cloud based VW process) the optimization mode setting can be set to whitelist cache and/or hot patch mode, which can require administrative approval.

In some examples, the VWO systems and processes apply optimizations and notify users of the results of the optimizations. These VWO systems and processes can receive requests for further optimizations from users and, in response, identify additional optimizations to apply and/or apply previous identified optimizations, thereby allowing the user to iterate through optimizations until a satisfactory optimization is found.

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

VW Optimization System

In some examples, a distributed computing system is configured to implement a VWO system. Further, in some examples, the system 100 can be configured to optimize VW processes within the VW system. For instance, in one example, the system 100 can operate in a configuration optimization mode that focuses on adjusting configuration settings of VW processes to enhance performance. In another example, the system 100 can operate in a whitelist cache and/or hot patch mode that focuses on setting up temporary caches for VW processes and/or deploying patches to VW processes. In some examples the optimization mode utilized by the system 100 can depend on the VW process targeted for optimization.

FIG. 1 illustrates a logical architecture of a VWO system 100 in accordance with these examples. As shown in FIG. 1, the system 100 includes event log agents 102A-102N, an event log service 106, a virtualization client application 110, a VWO service 122, VWO agents 128A-128Z a virtualization administration application 132. The log service 106 comprises an event log 108. The client application 110 includes a VWO user interface 112. The VWO service includes a log analyzer 124, an optimization techniques data store 130, and an event map data store 136. The administration application 132 includes a VWO administration interface 134. For ease of reference, each of the log agents 102A-102N and the VWO agents 128A-128Z may be referred to collectively as the log agents 102 and the VWO agents 128. Individual members of these collectives may be referred to generically as the log agent 102 and the VWO agent 128.

In some examples, the log agents 102 are installed on computing devices that host VW processes that collectively implement a VW system. Each of the log agents 102 is configured to collect event data 104 descriptive of the execution of VW processes resident on the computing device that hosts the log agent 102. These VW processes can include, for example, virtualization client applications (e.g., the client application 110), virtualization agents, and virtual resource brokers. The virtualization client applications are installed on user endpoint computing devices and are configured to provide users with access to virtual resources, such as virtual applications, virtual desktops, and virtual servers, that are hosted by computing devices physically distinct from the endpoint devices. Examples of virtualization client applications include the Citrix® Workspace application and the Citrix® Receiver application, both of which are commercially available from Citrix Systems of Fort Lauderdale, Fla. in the United States. The virtualization agents are installed on the computing devices that host the virtual resources and are configured to manage access to the virtual resources. Examples of virtualization agents include the Citrix® virtual delivery agent (VDA). The virtual resource brokers are configured to establish connections between the virtualization client applications and the virtual resources. Examples of virtual resource brokers include the Citrix® Broker service which is a part of Citrix® Delivery Controllers. Many VW systems include VW processes in addition to virtualization client applications, virtual resource brokers, and virtualization agents. Some examples of these additional VW processes are described further below with reference to FIGS. 8-15.

Each of the event log agents 102 can be configured to collect the event data 104 from various sources. For instance, in some examples, a log agent 102 is configured to monitor one or more VW processes via an event log implemented by the operating system of the computing device hosting the log agent 102. In these examples, the log agent 102 exchanges messages with the operating system (e.g., via an event log application program interface (API)) to collect events deposited by one or more VW processes. In other examples, a log agent 102 is configured to monitor one or more VW processes directly. In these examples, the log agent 102 subscribes to the one or more VW processes via an API supported by the one or more VW processes and receives events directly from the VW processes. In other examples, a log agent 102 is configured to monitor one or more VW processes by intercepting events involving the one or more VW processes by registering itself with one or more hooks. These hooks may be provided by the one or more VW processes, an operating system of the computing device hosting the one or more VW process, and/or some other software container supporting the one or more VW processes.

In some examples, the event data 104 is stored as a sequence of records, with each record in the sequence representing a distinct event. In these examples, each record of event data 104 can include one or more fields that are each configured to store a particular type of information. For instance, in some examples, each row of event data 104 can include populated fields configured to store an identifier of an event, a timestamp indicating when the event occurred, a type of the event, identifiers of VW processes involved in the event, identifiers of physical hardware involved in the event, and other event data.

In certain examples, some types of events are associated with, and indicate, initiation and termination of operations executed by the VW processes. Sequences of these operations, in turn, are associated with, and indicate, the initiation and termination of phases executed by the VW system. At least some of these phases involve interaction with a user of the client application 110. In certain examples, the profiling and optimization techniques disclosed herein are tailored to these user-interactive phases to illustrate performance bottlenecks within the phases and to recommend adjustments to the VW system to increase responsiveness of the client application 110. In some examples, populated data structures that associate events to operations, operations to phases, and operations to VW processes are stored in the event map data store 136. Table 1 lists example event data for types of events associated with initiation and termination of operations.

| Timestamp | CorrelationId | Component | Category | Action | Duration |
| --- | --- | --- | --- | --- | --- |
| 2019-12-10T13:57:26 | F4A569AF-6F2D-4192-87E5-9A551CCA651D | cwa | desktop | ica_session_launch | 40 |
| 2019-12-10T13:57:29 | F4A569AF-6F2D-4192-87E5-9A551CCA651D | gateway | desktop | ica_session_init | 7 |
| 2019-12-10T13:57:36 | F4A569AF-6F2D-4192-87E5-9A551CCA651D | connector | desktop | ica_session_received | 10 |
| 2019-12-10T13:57:46 | F4A569AF-6F2D-4192-87E5-9A551CCA651D | broker | desktop | resolve_address | 10 |
| 2019-12-10T13:57:56 | F4A569AF-6F2D-4192-87E5-9A551CCA651D | connector | desktop | ica_session_established | 10 |

In some examples, the log service 106 is configured to receive, process, and respond to messages from the log agents 102 that include the event data 104. More specifically, the log service 106 is configured to, as part of this processing, parse the event data 104 and store it in the event log 108 as event log entries. The event log 108 can be implemented using any of a variety of data storage technology, such as relational and/or non-relational databases, among other data storage technology. For instance, in at least one example, the event log service 106 is a Splunk® service commercially available from Spunk Incorporated of San Francisco, Calif. in the United States.

Figure 2A:
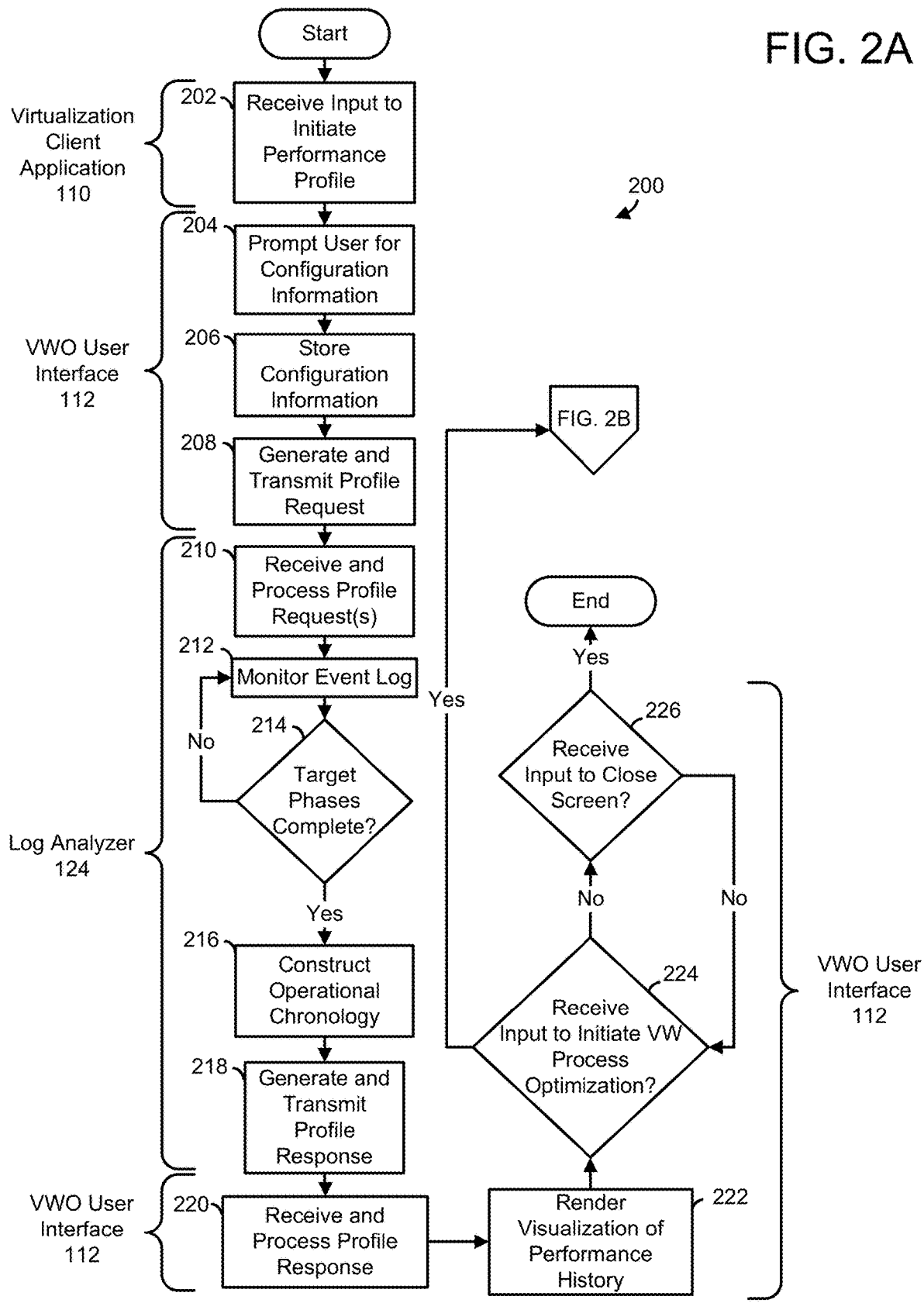
FIGS. 2A and 2B are a flow diagram of an optimization process in accordance with an example of the present disclosure.

In certain examples, the VWO user interface 112 is configured to interact with a user to enable configuration and initiation of VW profiling and optimization processes, such as the optimization process 200 described further below with reference to FIGS. 2A and 2B. As shown in FIG. 1, the VWO user interface 112 is configured to exchange messages including profile requests 114 and profile responses 116. Also as shown in FIG. 1, the system 100 is configured to operate in an optimization mode. As such, the VWO user interface 112 is configured to exchange message including optimization requests 118 and optimization responses 120 with the log analyzer 124. More specifically, in at least one example, the VWO user interface 112 is configured to generate and transmit the profile requests 114 and the optimization requests 118 and to receive and process the profile responses 116 and the optimization responses 120.

In some examples, each of the profile requests 114 includes an identifier of a phase of execution for which a profile is requested. Further, in these examples, each of the profile responses 116 includes performance history data that can be rendered by the VWO user interface 112 to visualize the operations of the VW processes executed within the requested and profiled phase. In some examples, the performance history data included within each of the profile responses 116 is encoded as a JavaScript Object Notation (JSON) object. An example of one such JSON object follows.

```
{
   totalTime:"StartTime=<b>2019-08-13T04:39:47</b><br>TotalLaunchTime=<b>5.437 seconds</b><br>",
   links: [
     {
       source: 0,
       target: 1,
       color: "green",
       label: "0 seconds",
     },
     {
       source: 1,
       target: 2,
       color: "red",
       label: "3 seconds",
     },
     {
       source: 3,
       target: 2,
       color: "yellow",
       label: "0.14 seconds",
     }
   ],
   nodes: [
     {
       id: 0,
       fixed:true,
       fx:60,
       fy:560,
       name: "Receiver",
     },
     {
       id: 1,
       fixed:true,
       fx:60,
       fy:60,
       name: "Workspace",
       gender: "male",
       hasCar: false,
       hasBike: true,
     },
     {
       id: 2,
       fixed:true,
       fx:560,
       fy:60,
       name: "DDC"
     },
     {
       id: 3,
       fixed:true,
       fx:560,
       fy:310,
       name: "Connector"
     }
   ];
};
```

Figure 4:
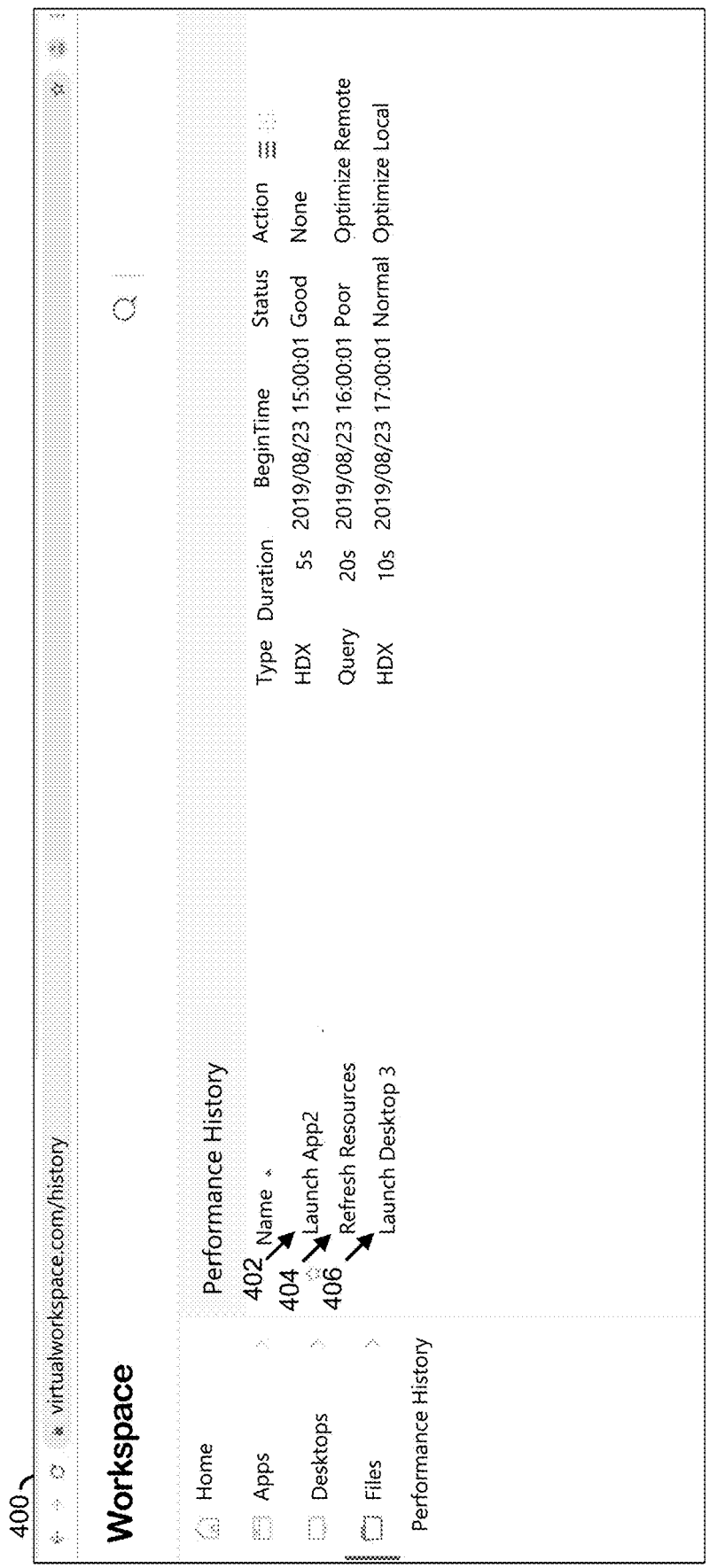
FIG. 4 is a front view of a performance history screen provided by a VWO user interface in accordance with an example of the present disclosure.
Figure 5:
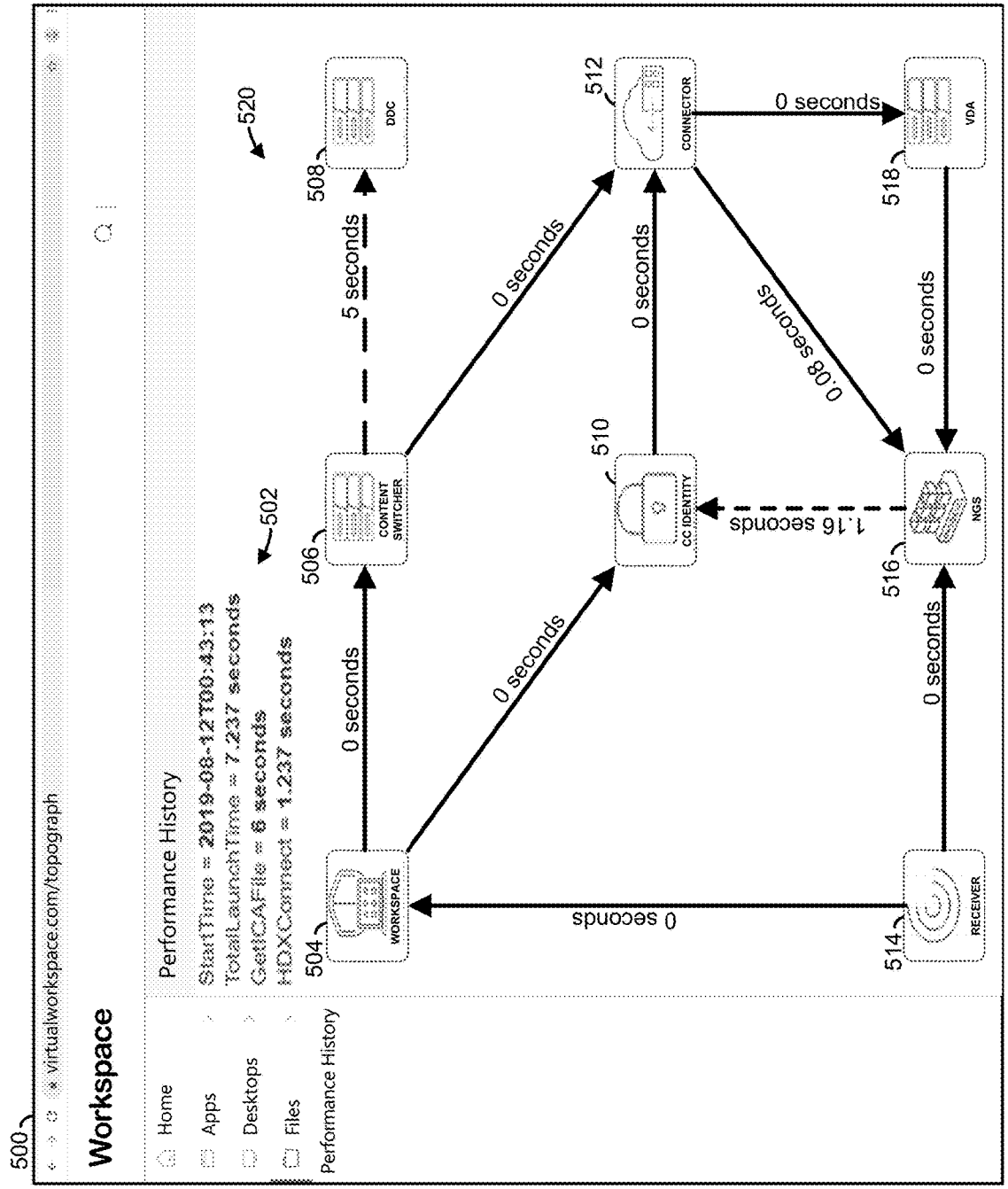
FIG. 5 is a front view of another performance history screen provided by a VWO user interface in accordance with an example of the present disclosure.
Figure 6:
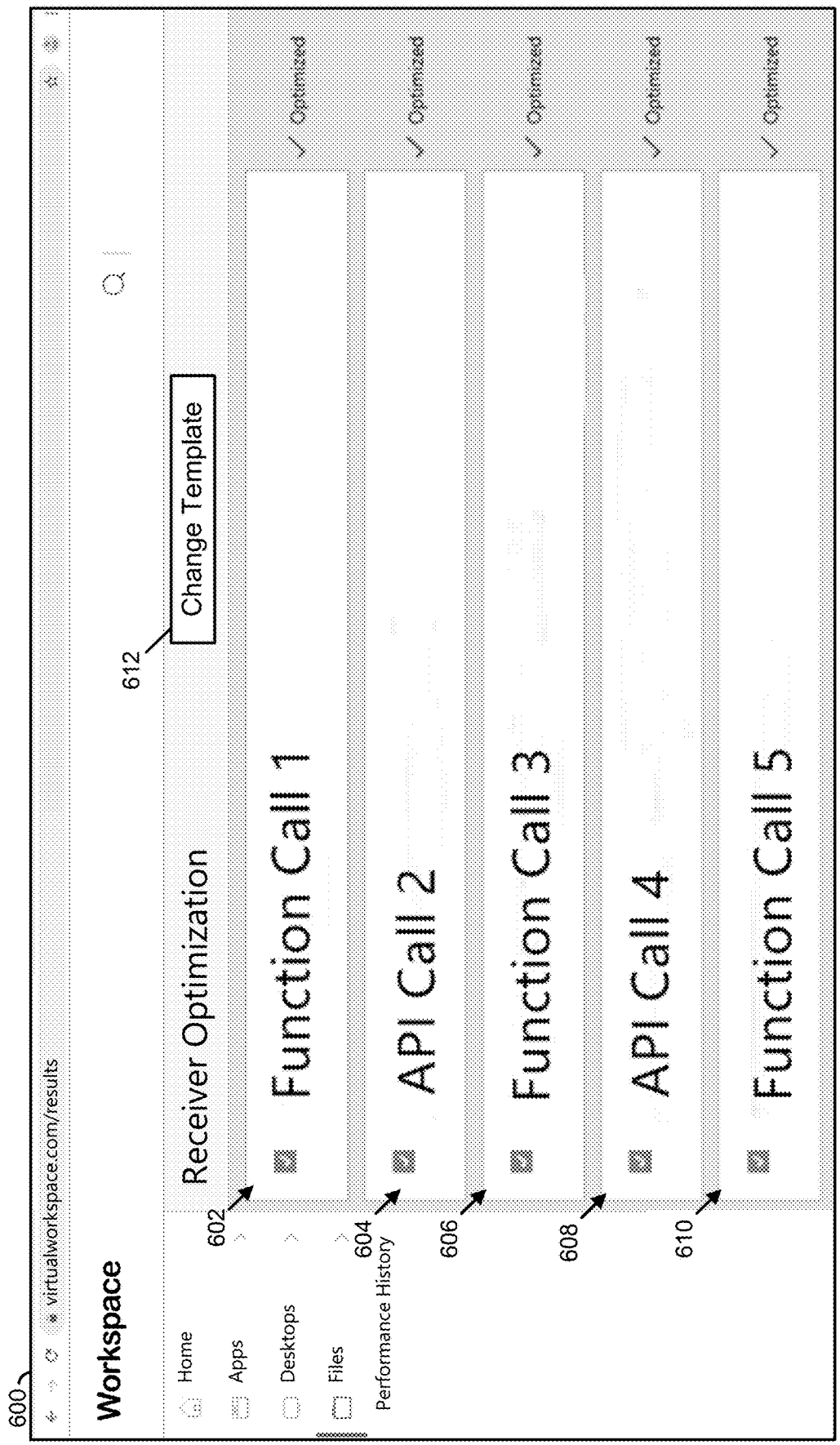
FIG. 6 is a front view of an optimization results screen provided by a VWO user interface in accordance with an example of the present disclosure.

FIGS. 4 and 5, which are described further below, illustrate screens including performance history data that the VWO user interface 112 is configured to render, in some examples. In certain examples, each of the optimization requests 118 includes an identifier of a VW process targeted for optimization, and each optimization response 120 includes performance enhancement data that can be rendered by the VWO user interface 112 to visualize the results of the optimization process. FIG. 6, which is described further below, illustrates a screen including performance enhancement data that the VWO user interface 112 is configured to render, in some examples.

Continuing with FIG. 1, the log analyzer 124 is configured to access the event log 108, the optimization data store 130, and the map data store 136 to generate the profile responses 116, the optimization responses 120, and the optimization instructions 126. In some examples, the log analyzer 124 is configured to access the event log 108 by exchanging API messages or otherwise interoperating with the log service 106. Further, in these examples, the log analyzer 124 is configured to access the optimization data store 130 and the map data store 136 via a relational or non-relational database engine, although other examples may employ other data access techniques.

In some examples, the log analyzer 124 is configured to generate a profile response 116 corresponding to a profile request 114. In these examples, the log analyzer 124 is configured to receive and parse the profile request 114 to extract the identifier of the phase targeted for profiling. The log analyzer 124 is also configured to query the map data store 136 to identify operations associated with the targeted phase, VW processes associated with the identified operations, and events indicating initiation and termination of the identified operations. The log analyzer 124 is further configured to search the event log 108 for the identified events and to use the timestamps of the event data returned by the search to construct a chronology of operations executed during the targeted phase. The log analyzer 124 is also configured to allocate a data structure to hold the profile response 116, store (e.g., in a JSON object) performance history that represents the chronology within the profile response 116, and transmit the profile response 116 to the VWO user interface 112 for subsequent processing.

In some examples, the log analyzer 124 can be configured to generate an optimization response 120 corresponding to an optimization request 118. In these examples, the log analyzer 124 is configured to receive and parse the optimization request 118 to extract the identifier of the VW process targeted for optimization. The log analyzer 124 is also configured to identify one or more optimization techniques stored in the optimization data store 130 that can enhance performance of the targeted VW process.

In certain examples, the type of optimization technique to be identified by the log analyzer 124 is specified by the optimization mode of the system 100. For instance, where the optimization mode of the system 100 is a configuration mode, the log analyzer 124 is configured to identify one or more configuration templates that can be applied to improve VW system performance. Alternatively or additionally, where the system configuration mode is whitelist/hot patch mode, the log analyzer 124 is configured to identify one or more white list cache settings and/or hot patches that can be applied to improve VW system performance.

In some examples, the optimization data store 130 can be configured to house one or more configuration templates that can enhance performance of the targeted VW process where the targeted VW process is executed by a VW system having certain features. In these examples, a configuration template can define one or more configuration settings for a targeted VW process, for one or more VW processes executed by the VW system other than the targeted VW process, and/or for other hardware/software components of the VW system. Further, in these examples, the log analyzer 124 can be configured to identify a particular configuration template by executing a machine learning process trained to map features of the VW system including the target VW process to the particular configuration template. In one example, this machine learning process is a support vector machine (SVM) trained to classify data descriptive of the VW system and its operations into a category associated with the particular configuration template. The data descriptive of the VW system and its operations used by the SVM can include features such as durations of particular operations executed within VW processes, configuration settings of VW processes and the computing devices that host the VW processes, success/failure rates of executed operations, one or more metrics quantifying a number of computing devices and/or the number of VW processes that implement the VW system, an indication of whether the VW system includes a gateway and, where the gateway is present, its type. Further, in these examples, the log analyzer 124 can be configured to generate one or more of the features listed above and to retrieve parameters for the trained SVM stored in the optimization data store 130 prior to execution of the trained SVM using both the features and the parameters. In some examples, the log analyzer 124 can be configured to generate the one or more features from the event log 108 and/or by interoperating with the VWO agents 128 (e.g., to retrieve configuration settings). In some examples, each of the VWO agents 128 is hosted by a computing device that implements the VW system. Each of the VWO agents 128 can be configured to read, transmit, receive, and write configuration settings for the computing device that hosts the VWO agent and/or for any VW processes hosted by the computing device. In some examples, each of the VWO agents 128 can be further configured to deploy whitelist caches and hot patches, as will be described further below. It should be noted that other machine learning/artificial intelligence processes can be used to identify sets of configuration templates, and the embodiments disclosed herein are not limited to a particular artificial intelligence technique.

In some examples, the optimization data store 130 can be configured to house one or more whitelist cache settings that can enhance performance of the targeted VW process where the targeted VW process is executed by a VW system operating under certain conditions. In these examples, a set of whitelist cache settings can define one or more cache settings for a targeted VW process. In these examples, each whitelist cache setting can specify data normally stored remotely from the targeted VW process to be stored locally with (e.g., on the same computing device as) the targeted VW process. Whitelist caches can be particularly helpful as temporary fixes for VW processes that are performing poorly due to long running API calls to remote processes. In examples where the optimization data store is configured to house a set of whitelist cache settings, the log analyzer 124 can be configured to identify a particular set of whitelist cache settings by identifying the particular set within a data structure stored in the optimization data store 130 that stores associations between targeted VW processes and sets of whitelist cache settings.

In some examples, the optimization data store 130 can be configured to house one or more hot patches that can enhance performance of the targeted VW process where the targeted VW process is executed by a VW system operating under certain conditions. In these examples, a set of hot patches can include one or more deployable software packages that can enhance performance of the targeted VW process. In these examples, each hot patch can be deployed to a computing device hosting the target VW process or computing devices hosting other VW processes within the VW system. In examples where the optimization data store is configured to house a set of hot patches, the log analyzer 124 can be configured to identify a particular set of hot patches by identifying the particular set within a data structure stored in the optimization data store 130 that stores associations between targeted VW processes and sets of hot patches.

Continuing with FIG. 1, the log analyzer 124 is configured to generate and transmit optimization instructions 126 based on the previous identified optimization techniques. Where the identified optimization techniques include one or more sets of configuration templates, the optimization instructions 126 include instructions to apply the one or more sets of configuration templates to the VW processes and/or computing devices that host the VW processes. These optimization instructions 126 can be executable by the VWO agents 128, and the log analyzer 124 can be configured to transmit the executable optimization instructions 126 to the VWO agents 128. The VWO agents 128, in turn, can be configured to receive and execute the optimization instructions 126, thereby applying the one or more sets of configuration templates to the VW system.

Where the identified optimization techniques include whitelist cache settings and/or hot patches, the optimization instructions 126 include instructions to apply the whitelist cache settings and/or the hot patches to the VW processes and/or computing devices that host the VW processes. These optimization instructions 126 can be instructions renderable as human language and/or instructions executable by the VWO agents 128. Where the optimization instructions 126 include instructions renderable as human language, the log analyzer 124 can be configured to transmit the instructions renderable as human language to the administrative interface 134. The administrative interface 134 can be configured to receive and render the instructions as human language to an administrative user. The administrative interface 134 can be further configured to prompt an administrative user to either confirm or prevent application of one or more whitelist cache settings and/or hot patches identified in the human language instructions 136. It should be noted that the administrative user can be an on-premises administrator in some examples and/or a cloud administrator in other examples. The administrative interface 134 can also be configured to receive a response to the prompt and to transmit the response to the log analyzer 124. The log analyzer 124 can be configured to handle a response to the prompt confirming application of the one or more whitelist cache settings and/or hot patches by transmitting the executable optimization instructions 126 to the VWO agents 128. The VWO agents 128, in turn, can be configured to receive and execute the optimization instructions 126, thereby applying the one or more whitelist cache settings and/or hot patches to the VW system.

In some examples, the log analyzer 124 is configured to generate the optimization response 120 by including information regarding any optimization techniques applied to enhance performance of the targeted VW process. Thus, the optimization response 120 can include a variety of information regarding configuration templates, whitelist caches, and/or hot patches applied to the VW system. FIG. 6, which is described further below, illustrates one example of an optimization response 120 when rendered by the VWO user interface 112.

In some examples, where optimization techniques applied by the system 100 include application of a first configuration template of a plurality of identified configuration templates, the VWO user interface 112 is configured to prompt the user to determine whether the enhanced performance of the VW process is satisfactory. In these examples, to handle input indicating that the enhanced performance is not satisfactory, the VWO user interface 112 is configured to generate and transmit another optimization request 118 that requests a second set of configuration templates by applied. In these examples, the log analyzer 124 is configured to interoperate with the VWO agents 128 to apply the second set of configuration templates. This approach allows a user to cycle through several different potential performance enhancements in search of a satisfactory configuration.

VW Optimization Processes

As described above, some examples of the VWO system 100 of FIG. 1 are configured to execute processes that enhance performance of one or more VW processes. FIGS. 2A and 2B illustrate an example of optimization process 200 executed by the system 100 in some examples.

Figure 3:
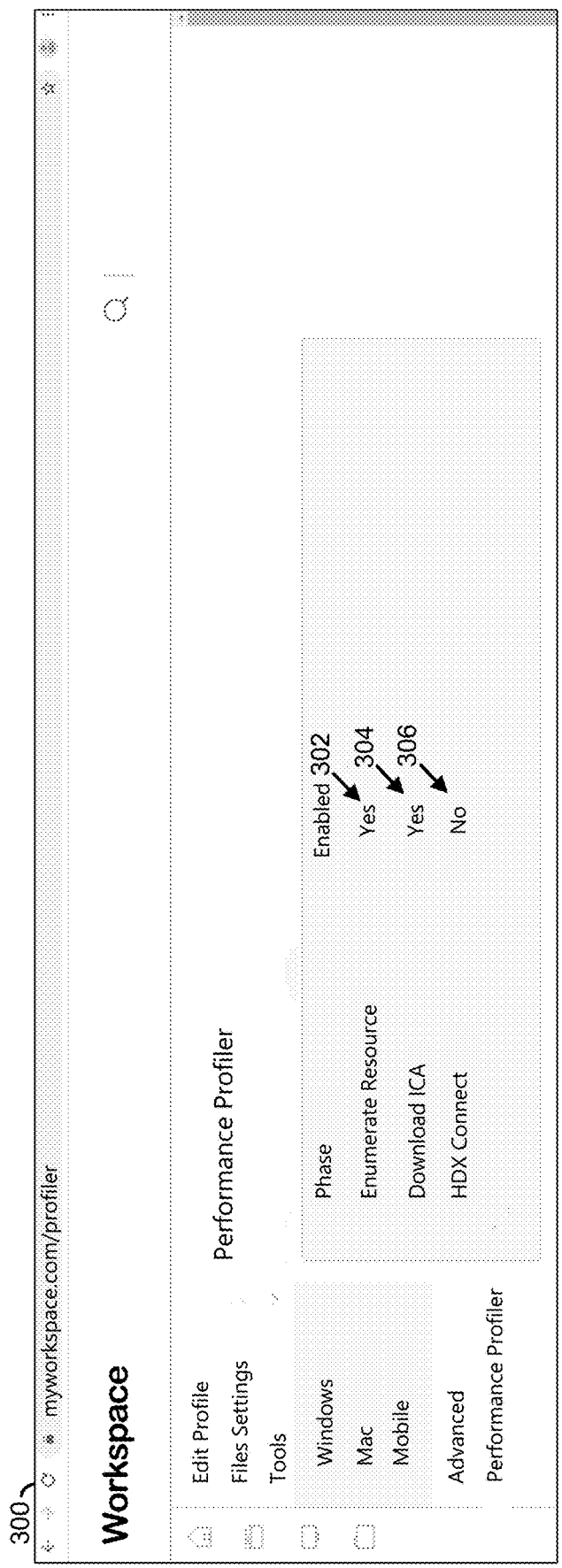
FIG. 3 is a front view of a profile options screen provided by a VW optimization (VWO) user interface in accordance with an example of the present disclosure.

The process 200 starts with a virtualization client application (e.g., the client application 110 of FIG. 1) hosted by a computing device (e.g., a computing platform as described below with reference to FIG. 7) receiving 202 input from a user. The input instructs the virtualization client application to initiate a performance profile of the VW system of which the virtualization client application is a part. The virtualization client application processes the input and initiates a VWO user interface (e.g., the VWO user interface 112 of FIG. 1) to prompt 204 the user to enter configuration information specifying phases of the VW system to target for profiling. FIG. 3 illustrates a profile options screen 300 rendered by the VWO user interface to collect this configuration information.

As shown in FIG. 3, the options screen 300 includes phase controls 302, 304, and 306. The phase control 302 is labeled "Enumerate Resources," is associated with an enumerate resources phase, and is currently enabled for profiling. The phase control 304 is labeled "Download ICA," is associated with resource allocation phase, and is currently enabled for profiling. The phase control 306 is labeled "HDX Connect," is associated with a resource connection phase and is currently disabled. In response to receiving a selection of any of the phase controls 302, 304, and 306, the VWO user interface toggles its Boolean value to either enabled or disabled. With combined reference to FIGS. 2A and 3, in response to receiving input to close the screen 300, the VWO user interface stores 206 the configuration information. The VWO user interface generates and transmits 208, to a log analyzer (e.g., the log analyzer 124 of FIG. 1), a profile request (e.g., of profile requests 114 of FIG. 1) for each phase associated with an enabled phase control. In some examples, the VWO user interface transmits 208 the profile request via an API implemented by a VWO service (e.g., the VWO service 122 of FIG. 1).

Returning to FIG. 2A, the log analyzer receives the profile request and processes 210 the profile request to retrieve one or more identifiers of the one or more phases targeted for profiling included therein. The log analyzer queries a map data store (e.g., the map data store 136) to identify events associated with initiation and termination of operations included in the targeted phases. The log analyzer interoperates with an event log service (e.g., the event log service 106 of FIG. 1) to monitor 212 an event log (e.g., the event log 108 of FIG. 1) for events generated by the VW system. The log analyzer determines 214 whether the targeted phases are complete (e.g., by monitoring the event log for termination events for the targeted phases). Where the log analyzer determines that the targeted phases are not complete, the log analyzer continues to monitor 212 the event log. Where the log analyzer determines that the targeted phases are complete, the log analyzer constructs 216 an operational chronology for the targeted phases. The log analyzer then generates and transmits 218, to the VWO user interface, a profile response (e.g., of profile responses 116 of FIG. 1) including a performance history based on the operational chronology.

In some examples, the VWO user interface receives and processes 220 the profile response to retrieve the performance history. The VWO user interface renders 222 a visualization of the performance history. FIGS. 4 and 5 illustrate performance history screens 400 and 500 rendered by the VWO user interface to provide this visualization in some examples.

As shown in FIG. 4, the history screen 400 includes phase history controls 402, 404, and 406. Each of these history controls is associated with one or more previous executed phases. The history control 402 is labeled "Launch App2" and is associated with a combination of completed resource allocation and resource connection phases. The history control 404 is labeled "Refresh Resources" and is associated with a completed resource enumeration phase. The history control 406 is labeled "Launch Desktop 3" and is associated with another combination of completed resource allocation and resource connection phases. Each of the history controls 402, 404, and 406 includes text fields that articulate an overall type of the one or more phases associated with the history control, a duration of the one or more phases, a time the one or more phases started, an overall status of the one or more phases, and a suggested optimization action for the one or more phases. In some examples, in response to receiving a selection of any of the history controls 402, 404, and 406, the VWO user interface renders the history screen 500.

As shown in FIG. 5, the history screen 500 includes a performance summary control 502 and a performance topographic control 520, both of which are descriptive of the one or more phases associated with the history control selected in the history screen 400. The performance summary control 502 includes text fields that articulate a starting time of the one or more phases, a total duration for the one or more phases, and a duration for each phase within the one or more phases, if plural phases are present. As show in FIG. 5, the history control selected from FIG. 4 includes a resource allocation phase (labeled as "GetICAFile") and a resource connection phase (labeled as an "HDXConnect").

As shown in FIG. 5, the performance topographic control 520 includes a plurality of nodes 504-518 connected by a plurality of links. Each of the plurality of nodes is labeled and associated with a name of a VW process. More specifically, the node 504 is labeled and associated with a virtual workspace service implemented within a VW system. The node 506 is labeled and associated with a content switching service implemented within the VW system. The node 508 is labeled and associated with a "DDC" (or broker) service implemented within the VW system. The node 510 is labeled and associated with a "CC Identity" (or identity provision) service implemented within the VW system. The node 512 is labeled and associated with a connector service implemented within the VW system. The node 514 is labeled and associated with a "receiver" (or virtualization client) application implemented within the VW system. The node 516 is labeled and associated with a "NGS" (or gateway) service implemented within the VW system. The node 518 is labeled and associated with "VDA" (or a virtualization agent) application implemented within the VW system.

As shown in FIG. 5, each of the links between nodes is labeled with a time value that indicates an amount of time required for an operation involving the linked nodes to complete. All of the links illustrated in FIG. 5 have negligible duration except for the link between node 516 and node 510, which recites a duration of 1.16 seconds, and the link between node 506 and node 508, which recites a duration of 5 seconds. As shown in FIG. 5, the link between node 516 and node 510 is annotated to indicate that contributes minorly to the overall duration and the link between node 506 is annotated to indicate that it substantially to the overall duration. In some examples, these annotations may take the form of different colors or line times. Also, in some examples, the VWO user interface determines the annotation to render based on threshold analysis of the link durations. The thresholds associated with different annotations can be absolute (e.g., a link duration less than 1 second is annotated in green, a link duration between 1 second and 4 seconds is annotated in yellow, and a link duration over 4 seconds is annotated in red). The thresholds associated with different annotations can also be relative (e.g., based on a ratio of a link duration to the overall duration). In some examples, each of the nodes 504-518 is selectable to initiate optimization of VW process associated with the node.

It should be noted that, in some examples, either or both of the history screens 400 and 500 can include one or more controls that display indications of the number of users of similar VW systems who have selected to optimize a particular VW process. Additionally, in some examples, the VWO user interface is configured to transmit a notification to the administrative application 132 if a user requests an optimization, thereby notifying an administrative user of a potential performance problem.

Returning to FIG. 2A, the VWO user interface determines 224 whether it has received input (e.g., selection of one or more of the nodes 504-518 of FIG. 5) to initiate optimization of a VW process (e.g., the VW process associated with the selected node). If the VWO user interface determines 224 that it has received input to initiate optimization of a VW process, the VWO user interface generates and transmits 228 an optimization request (e.g., of the optimization requests 118 of FIG. 1) to the log analyzer. If the VWO user interface determines that it has not received input to initiate optimization of a VW process, the VWO user interface determines 226 whether it has received input to close the screen. Where the VWO user interface determines 226 that it has received input to close the screen, the VWO user interface does so and the process 200 ends. Where the VWO user interface determines 226 that it has not received input to terminate the screen, the VWO user interface returns to determine whether it has received input to initiate a VW optimization process.

Figure 2B:
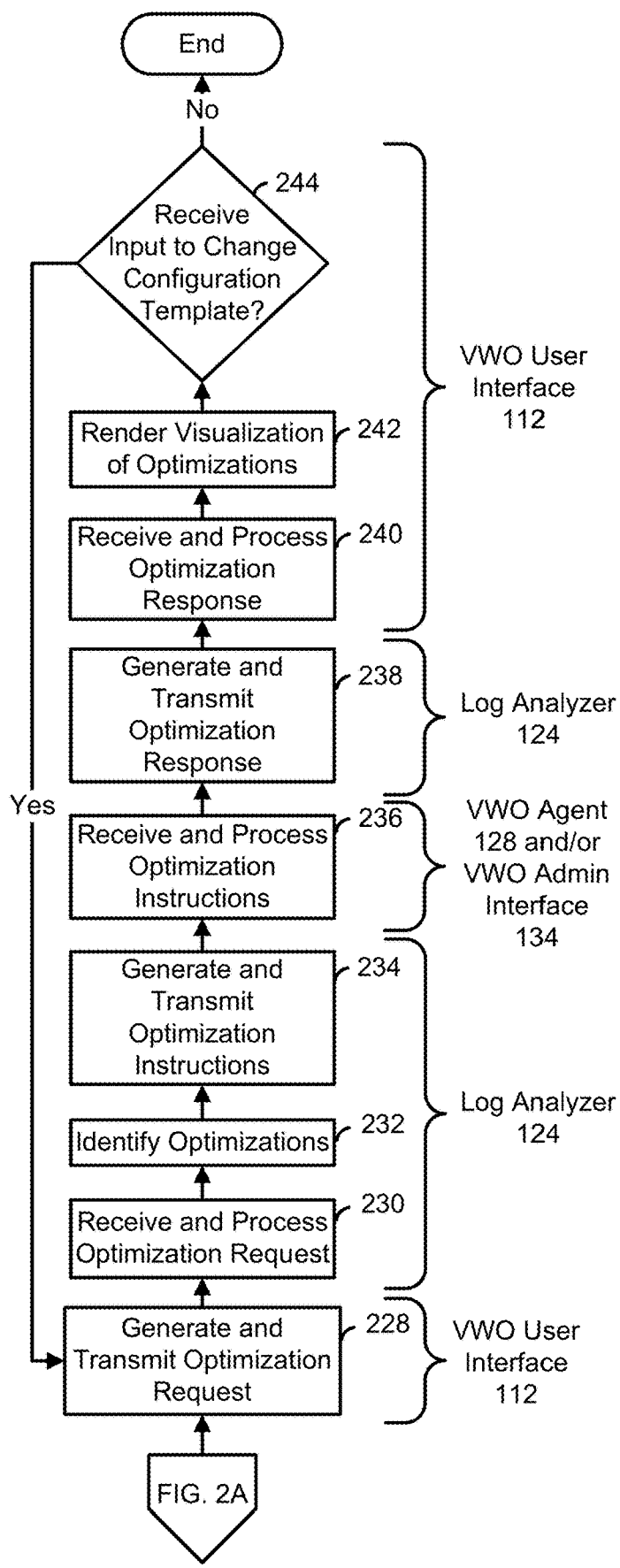

As shown in FIG. 2B, the log analyzer receives and processes 230 the optimization request to retrieve an identifier of the VW process targeted for optimization. The log analyzer identifies 232 optimizations available for the targeted VW process. For instance, the log analyzer can identify optimizations by identifying whitelist cache settings and/or hot patches associated with the targeted VW process within a data structure stored in an optimization techniques data store (e.g., the optimizations data store 130 of FIG. 1). Alternatively or additionally, in some examples, the log analyzer can identify optimizations by identifying one or more configuration templates applicable to enhance performance of the VW process and the VW system overall. In these examples, the log analyzer generates a set of features descriptive of the VW system, retrieves parameters of a trained SVM from the optimization techniques data store, and executes the SVM using the set of features and the parameters to identify the one or more configuration templates.

Continuing with FIG. 2B, the log analyzer generates and transmits 234 optimization instructions to apply the identified optimizations. Where the identified optimizations include one or more configuration templates, the optimization instructions to apply the one or more configuration templates are executable by one or more VWO agents (e.g. of the VWO agents 128 of FIG. 1). Where the identified optimizations include whitelist cache settings and/or hot patches, the optimization instructions to apply the whitelist cache settings and/or hot patches include instructions executable by the one or more VWO agents and human language instructions. In some examples, the log analyzer transmits 234 optimization instructions executable by the one or more VWO agents to the VWO agents and transmits 234 optimization instructions renderable as human language to a VWO administrative interface (e.g., the VWO administrative interface 134 of FIG. 1). In some examples the log analyzer transmits the instructions renderable as human language to the VWO administrative interface via an API implemented by a virtualization administrative application (e.g., the administrative application 132 of FIG. 1).

In some examples, the VWO agent and/or the VWO administrative interface receive and process 236 the optimization instructions. For instance, the VWO administrative interface can process the optimization instructions to render instructions as human language, thereby prompting an administrative user to review and approve of a whitelist cache setting and/or a hot patch deployment. Alternatively or additionally, the VWO agent can process the optimization instructions to deploy a configuration template, an approved whitelist cache setting and/or an approved hot patch to a computing device hosting the VWO agent. In some examples, the VWO agent and/or the VWO administrative interface interoperate with the log analyzer to return results (e.g., success and/or failure) of their processing 236 of the optimization instructions.

Continuing with FIG. 2B, the log analyzer generates and transmits 238 an optimization response (e.g., of the optimization responses 120 of FIG. 1) to the VWO user interface. The VWO user interface receives and processes 240 the optimization response to retrieve performance enhancement data included therein. The VWO user interface renders 242 a visualization of the performance enhancement data. FIG. 6 illustrates an optimization results screen 600 rendered by the VWO user interface to provide this visualization in some examples.

As shown in FIG. 6, the results screen 600 includes results controls 602-610 and a change template control 612. Each of the results controls 602-610 is labeled and associated with a subprocess (e.g., function or API call) that was enhanced via an optimization. In this example, the VW process subject to optimization was a virtualization client application ("Receiver"). Further, in this example, the results controls 604 and 608 indicate that a whitelist cache setting was applied to enable nearly instantaneous responses and the results controls 602, 606, and 610 indicate that a configuration template was applied to enhance their execution speed. In some examples, the change template control 612 is selectable to request that a different configuration template be automatically applied to enhance performance of the targeted VW process.

Returning to FIG. 2B, the VWO user interface determines 244 whether it has received input (e.g., selection of one or the change template control 612 of FIG. 6) to initiate a change to the configuration template applied to enhance performance of the target VW process. Where the VWO user interface determines that it has received input to change the configuration template, the VWO user interface returns to generate and transmit 228 an optimization request that includes a configurable parameter to prevent the previously identified configuration template from being identified again. Where the VWO user interface determines that it has not received input to change the configuration template, the process 200 ends.

Processes in accord with the optimization process 200 enable a VWO system to enhance its performance in response to a user's request to do so. This functionality allows the VW system to harness its users to monitor, report, and correct poorly performing VW processes, thereby relaxing the need for system resources devoted to this effort.

The process 200 as disclosed herein depicts one particular sequence of acts in a particular example. Some acts are optional and, as such, can be omitted in accord with one or more examples. Additionally, the order of acts can be altered, or other acts can be added, without departing from the scope of the apparatus and methods discussed herein.

Computing Platform for VWO Systems

Figure 7:
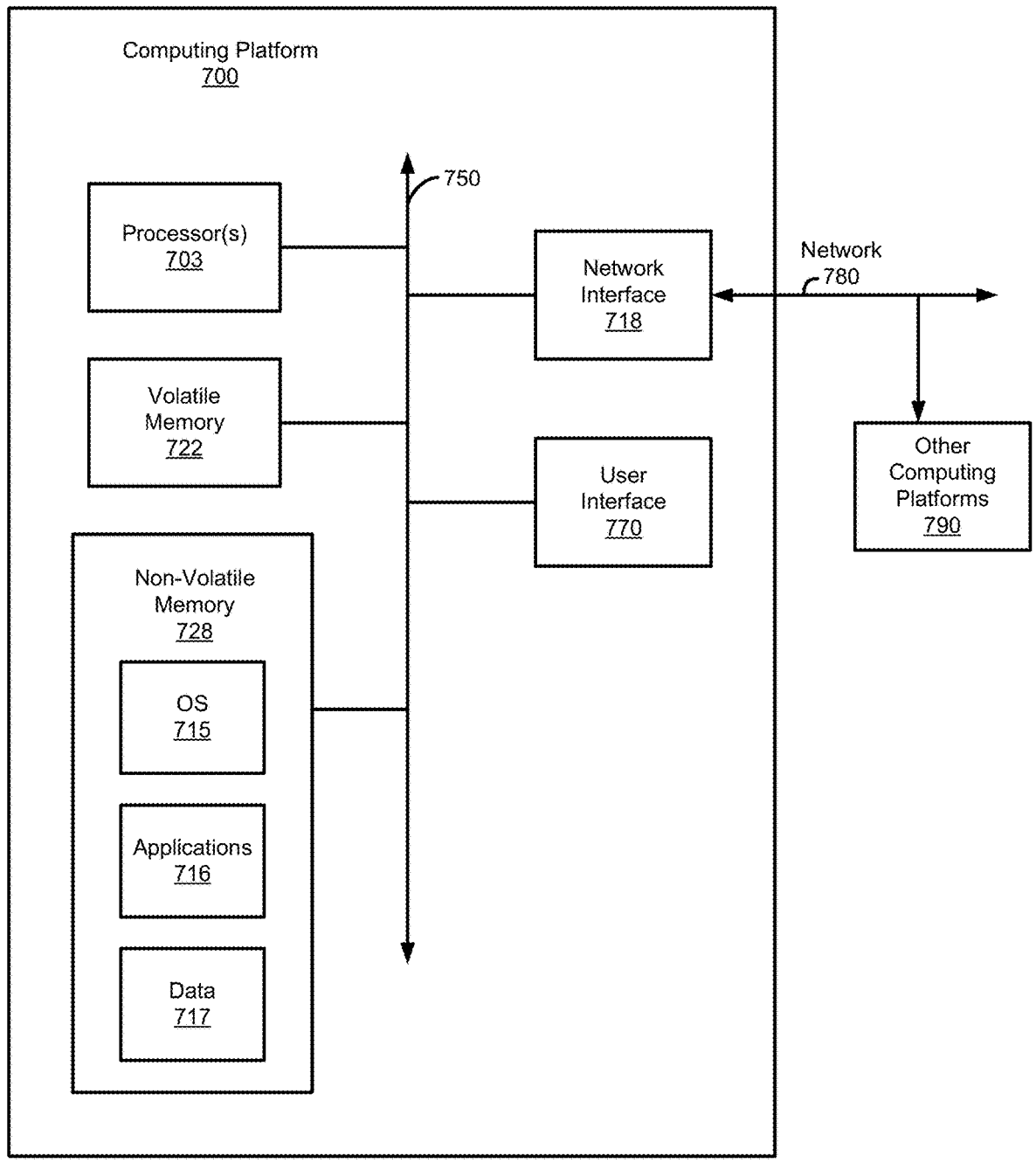
FIG. 7 is a block diagram of a network environment of computing devices in which various aspects of the present disclosure can be implemented.

FIG. 7 is a block diagram of a computing platform 700 configured to implement various VWO systems and processes in accordance with examples disclosed herein.

The computing platform 700 includes one or more processor(s) 703, volatile memory 722 (e.g., random access memory (RAM)), non-volatile memory 728, a user interface (UI) 770, one or more network or communication interfaces 718, and a communications bus 750. The computing platform 700 may also be referred to as a client device, computing device, endpoint, computer, or a computer system.

The non-volatile (non-transitory) memory 728 can include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 770 can include a graphical user interface (GUI) (e.g., controls presented on a touchscreen, a display, etc.) and one or more input/output (I/O) devices (e.g., a mouse, a keyboard, a microphone, one or more speakers, one or more cameras, one or more biometric scanners, one or more environmental sensors, and one or more accelerometers, one or more visors, etc.) and/or a software stack to drive such devices.

The non-volatile memory 728 stores an operating system 715, one or more applications or programs 716, and data 717. The operating system 715 and the application 716 include sequences of instructions that are encoded for execution by processor(s) 703. Execution of these instructions results in manipulated data. Prior to their execution, the instructions can be copied to the volatile memory 722. In some examples, the volatile memory 722 can include one or more types of RAM and/or a cache memory that can offer a faster response time than a main memory. Data can be entered through the user interface 770 or received from the other I/O device(s), such as the network interface 718. The various elements of the platform 700 described above can communicate with one another via the communications bus 750.

The illustrated computing platform 700 is shown merely as an example client device or server and can be implemented within any computing or processing environment with any type of physical or virtual machine or set of physical and virtual machines that can have suitable hardware and/or software capable of operating as described herein.

The processor(s) 703 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory. In some examples, a processor can be configured to perform one or more operations by being coupled to a memory storing instructions executable by the processor to perform the one or more operations.

The processor(s) 703 can be analog, digital or mixed. In some examples, the processor(s) 703 can be one or more physical processors, or one or more virtual (e.g., remotely located or cloud) processors. A processor including multiple processor cores and/or multiple processors can provide functionality for parallel, simultaneous execution of instructions or for parallel, simultaneous execution of one instruction on more than one piece of data.

The network interfaces 718 can include one or more interfaces to enable the computing platform 700 to access a computer network 780 such as a Local Area Network (LAN), a Wide Area Network (WAN), a Personal Area Network (PAN), or the Internet through a variety of wired and/or wireless connections, including cellular connections and Bluetooth connections. In some examples, the network 780 may allow for communication with other computing platforms 790, to enable distributed computing.

In described examples, the computing platform 700 can execute an application on behalf of a user of a client device. For example, the computing platform 700 can execute one or more virtual machines managed by a hypervisor. Each virtual machine can provide an execution session within which applications execute on behalf of a user or a client device, such as a hosted desktop session. The computing platform 700 can also execute a terminal services session to provide a hosted desktop environment. The computing platform 700 can provide access to a remote computing environment including one or more applications, one or more desktop applications, and one or more desktop sessions in which one or more applications can execute.

Figure 8:
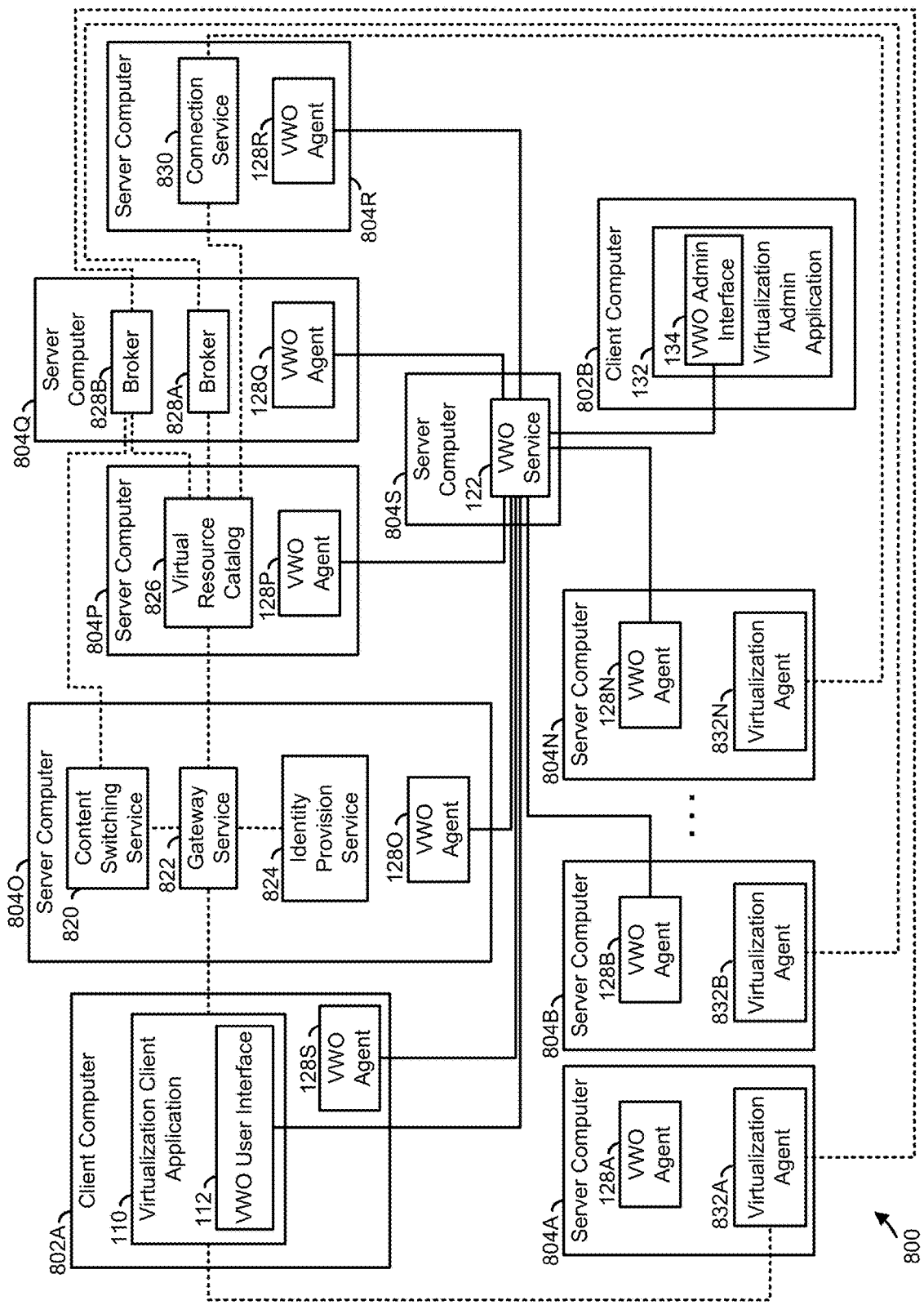
FIG. 8 is a block diagram of the VWO system of FIG. 1 as implemented by a configuration of computing devices in accordance with an example of the present disclosure.

FIG. 8 illustrates a VWO system (e.g., the system 100 of FIG. 1) configured for operation within a distributed computing platform. As shown in FIG. 8, the configuration 800 also implements portions of a hybrid on-premises/cloud VW system and includes client computers 802A and 802B and server computers 804A-804S. Within the configuration 800, the computer systems 802A, 802B, and 804A-804S are communicatively coupled to one another and exchange data via a one or more networks.

As illustrated in FIG. 8, the client computer 802A is configured to host the client application 110 and the VWO agent 128S of FIG. 1. The client computer 802B is configured to host the administrative application 132 of FIG. 1. Examples of the client computers 802A and 802B include the computing platform 700 of FIG. 7. The server computer 804A is configured to host the VWO agent 128A of FIG. 1 and a virtualization agent 832A (e.g., a Citrix® VDA). The server computer 804B is configured to host the VWO agent 128B of FIG. 1 and a virtualization agent 832B. The server computer 804N is configured to host the VWO agent 128N of FIG. 1 and a virtualization agent 832N (e.g., another Citrix® VDA). The server computer 804O is configured to host the VWO agent 128O of FIG. 1, a content switching service 820, a gateway service 822, and an identity provision service 824. In some examples, the server computer 804O is a Citrix® NetScaler® gateway. The server computer 804P is configured to host the VWO agent 128P of FIG. 1 and a virtual resource catalog 826 (e.g., a Citrix® StoreFront™ service or Citrix Workspace™ service). The server computer 804Q is configured to host the VWO agent 128Q of FIG. 1 and two virtual resource brokers 828A and 828B. In some examples, the server computer 804Q is a Citrix® delivery controller. The server computer 804R is configured to host the VWO agent 128R of FIG. 1 and a connection service 830 (e.g., a Citrix Cloud Connector™ service). The server computer 804S is configured to host the VWO service 122 of FIG. 1. Examples of the server computers 804A-804S include the computing platform 700 of FIG. 7. In some examples, each of the client computers 802A and 802B and server computers 804A-804S is configured to host an event log agent (e.g., the event log agent 102 of FIG. 1) that monitors operations of the computer and transmits event data to an event log service (e.g., the event log service 106 of FIG. 1) that is accessible to an VWO service 122 hosted by the server computer 804S. Some of the components illustrated in FIG. 8 are described above with reference to FIGS. 1, 2A, and 2B. For purposes of brevity, those descriptions will not be repeated here, but each of these components is configured to function with reference to FIG. 8 as described with reference to its respective figure. The description of these component may be augmented or refined below.

In the example of FIG. 8, VW processes that constitute the hybrid on-premises/cloud VW system include the client application 110, the virtualization agents 832A-832N, the content switching service 820, the gateway service 822, the identity provision service 824, the virtual resource catalog 826, the virtual resource broker 828, and the connection service 830. A brief introduction to each VW process is now provided.

As shown in FIG. 8, the client application 110 provides a user access to virtual resources via the virtualization agents 832A-832N. In addition to providing access to virtual resources to the client application 110, the virtualization agents 832A-832N monitor computing resources available on the server computers 804A-804N and interoperate with load balancers (e.g., the brokers 828A and 828B) and other connectors (e.g., the connection service 830) to register and update the computing resources available for allocation to virtual resources. The virtual resource catalog 826 interoperates with the brokers 828A and 828B to determine virtual resources that can be made avail to the client application 110 via the gateway service 822. The gateway service 822 is a proxy for the client application 110 and increases responsiveness of the client application 110. The content switching service 820 directs requests for virtual resources to load balancers that front specific server computers. The content switching service 820 can be used to, for example, allow devices having an internet protocol address with a predefined range to access a special portal or serve content relevant to a particular geographic area to device located within that area. The identity provision service 824 can authenticate credentials to allow access to virtual resources.

As shown in FIG. 8, the client application 110 interoperates with the virtualization agent 832A to provide a user access to virtual resources hosted by the server computer 804A. In some examples, to allocate and connect to virtual resources, the client application 110 interoperates with the gateway service 222 via an API implemented by the gateway service 222. In one such interoperation, the client application 110 provides access credentials to the gateway service 822, and the gateway service 822 interoperates with the identity provision service 824 to authenticate the access credentials. In another interaction, the client application 110 requests a list of virtual resources available for the authenticated credentials, and the gateway service 822 interoperates with the virtual resource catalog 826 to generate the list and returns the list to the client application 110 for presentation to the user. In another interaction, the client application 110 requests access to a virtual resource subject to content switching, and the gateway service 822 interoperates with the content switching service 820 to identify connection information for the virtual resource and returns the connection information to the client application 110. In response to receiving the connection information, the client application 110 interoperates with the virtualization agent 832A to establish a connection to the requested virtual resource.

Other VW processes illustrated in FIG. 8 interoperate with one another to prepare for requests for virtual resource. For instance, in some examples, the content switching service 820 interoperates with the broker 828B when generating connection information at the request of the gateway service 822. In these examples, during initialization the virtualization agent 832A interoperates with the broker 828B to register the server computer 804A with the broker 828B. In some examples, to identify virtual resources hosted by on-premise server computers 804A and 804B, the virtual resource catalog 826 interoperates with the brokers 828A and 828B. In these examples, during initialization the virtualization agent 832B interoperates with the broker 828A to register the server computer 804B with the broker 828A. Similarly, in some examples, to identify virtual resources hosted by cloud server computers 804N, the virtual resource catalog 826 interoperates with the connection service 830. In these examples, during initialization the virtualization agent 832N interoperates with the connection service 830 to register the server computer 804N with the connection service 830.

The VWO system illustrated within the context of the configuration 800 can operate as follows. In some examples, the VWO service 122 receives requests to profile a phase of execution of the VW system described above. In these examples, the VWO service 122 interoperates with an event log service (e.g., the log service 106 of FIG. 1) to identify events associated with operations executed by VW processes within the phase. The VWO service 122 constructs a chronology of operations executed by the VW processes from the identified events. The VWO service 122 provides this chronology to the VWO user interface 112. The VWO user interface presents the chronology to a user. The VWO user interface 112 receives input to request optimization of a targeted VW process. The VWO user interface 112 transmits a request to optimize the targeted VW process to the VWO service 122. The VWO service 122 identifies one or more optimizations and transmits instructions to apply the identified optimizations to the VWO agents 128A-128S and/or the VWO administrative interface 134. The VWO agents 128A-128S apply the optimizations. The VWO service transmits performance enhancement information to the VOW user interface 112. The VWO user interface 112 presents the performance enhancement information to the user. The VWO user interface 112 receive input to request a change to the optimization (e.g., a change to a configuration template applied to one of the computers illustrated in FIG. 8 via one of the VWO agents 128A-128S). The VWO user interface 112 transmits a request to change an optimization to the VWO service 112. The VWO service 112 transmits instructions to apply a new optimization (e.g., a second identified optimization) to the VWO agents 128A-128S and/or the VWO administrative interface 134. The VWO agents 128A-128S apply the new optimization. This optimization change process can occur multiple times.

The configuration 800 is but one example of many potential configurations that can be used to implement the system 100. As such, the examples disclosed herein are not limited to the particular configuration 800 and other configurations are considered to fall within the scope of this disclosure.

Figure 9:
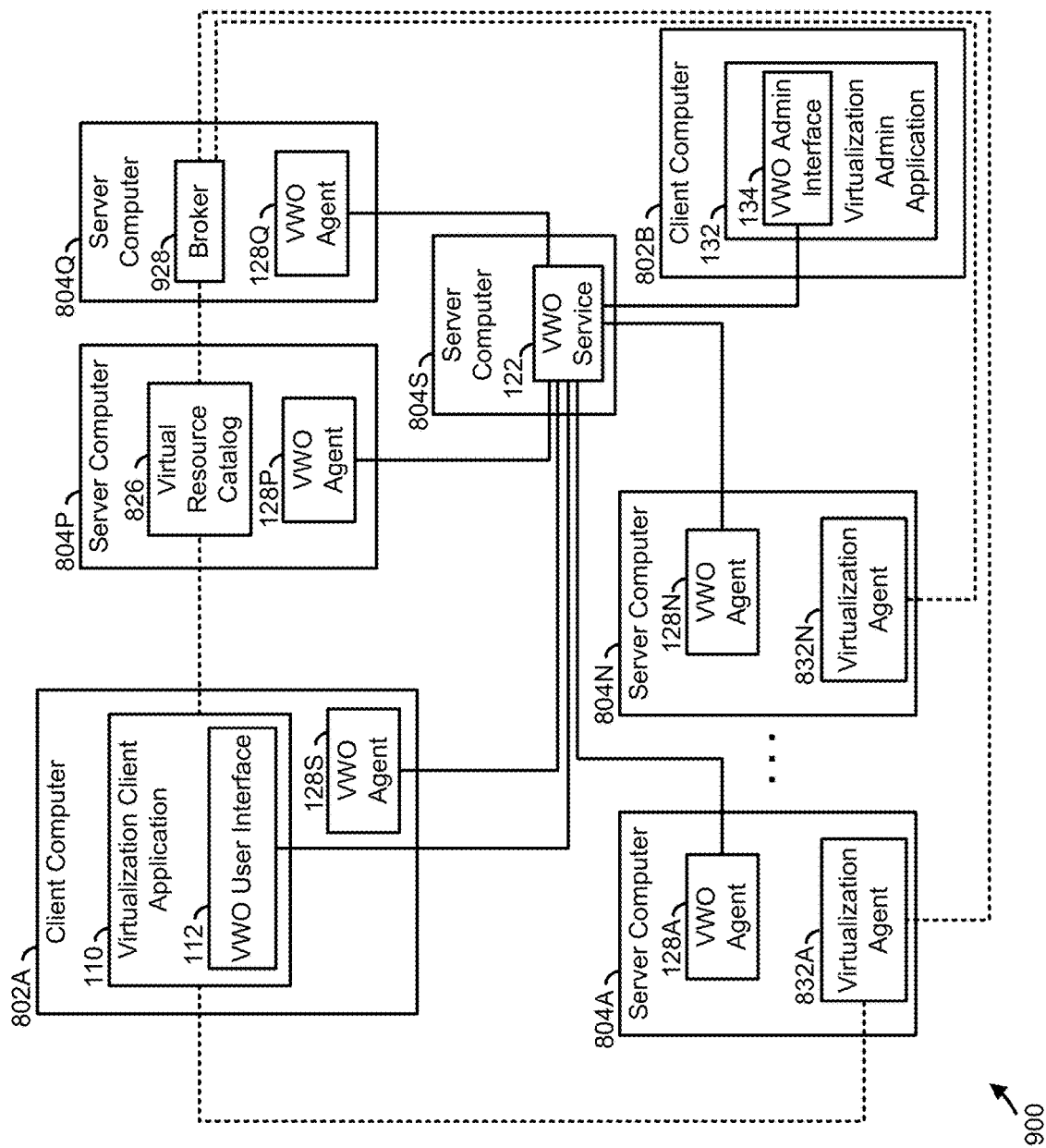
FIG. 9 is a block diagram of the VWO system of FIG. 1 as implemented by another configuration of computing devices in accordance with an example of the present disclosure.

FIG. 9 illustrates a VWO system (e.g., the system 100 of FIG. 1) configured for operation within a distributed computing platform (e.g. the computing platform 700 of FIG. 7). As shown in FIG. 9, the configuration 900 also implements portions of an on-premises VW system and includes the client computers 802A and 802B and server computers 804A-804S. Within the configuration 900, the computer systems 802A, 802B, and 804A-804S are communicatively coupled to one another and exchange data via a one or more networks.

As illustrated in FIG. 9, the client computer 802A is configured to host the client application 110 and the VWO agent 128S of FIG. 1. The client computer 802B is configured to host the administrative application 132 of FIG. 1. Examples of the client computers 802A and 802B include the computing platform 700 of FIG. 7. The server computer 804A is configured to host the VWO agent 128A of FIG. 1 and the virtualization agent 832A of FIG. 8. The server computer 804N is configured to host the VWO agent 128N of FIG. 1 and the virtualization agent 832N of FIG. 8. The server computer 804P is configured to host the VWO agent 128P of FIG. 1 and the virtual resource catalog 826 of FIG. 8. The server computer 804Q is configured to host the VWO agent 128Q of FIG. 1 and a virtual resource broker 928. The server computer 804S is configured to host the VWO service 122 of FIG. 1. Examples of the server computers 804A-804S include the computing platform 700 of FIG. 7. Some of the components illustrated in FIG. 9 are described above with reference to FIGS. 1, 2A, 2B, and 8. For purposes of brevity, those descriptions will not be repeated here, but each of these components is configured to function with reference to FIG. 9 as described with reference to its respective figure. The description of these component may be augmented or refined below.

In the example of FIG. 9, VW processes that constitute the on-premises system include the client application 110, the virtualization agents 832A-832N, the virtual resource catalog 826, and the virtual resource broker 928. As shown in FIG. 9, the virtualization agents interoperate with a load balancer (e.g., the broker 928) to register and update the computing resources available for allocation to virtual resources. The virtual resource catalog 826 interoperates with the broker 928 to determine virtual resources that can be made avail to the client application 110.

As shown in FIG. 9, the client application 110 interoperates with the virtualization agent 832A to provide a user access to virtual resources hosted by the server computer 804A. In some examples, to allocate and connect to virtual resources, the client application 110 interoperates with the virtual resource catalog 826 and the broker 928 via APIs implemented by the virtual resource catalog 826 and the broker 928. In one such interoperation, the client application 110 requests a list of virtual resources available to the client application 110, and the virtual resource catalog 826 generates and returns the list the client application 110 for presentation to the user. In another interaction, the client application 110 requests access to a virtual resource, and the broker 928 identifies connection information for the virtual resource and returns the connection information to the client application 110. In response to receiving the connection information, the client application 110 interoperates with the virtualization agent 832A to establish a connection to the requested virtual resource.

Other VW processes illustrated in FIG. 9 interoperate with one another to prepare for requests for virtual resource. For instance, in some examples, during initialization the virtualization agents 832A-832N interoperate with the broker 928 to register the server computers 804A-804N with the broker 928. In some examples, to identify virtual resources hosted by on-premise server computers 804A-804N, the virtual resource catalog 826 interoperates with the broker 928.

The VWO system illustrated within the context of the configuration 900 can operate as described with reference to FIG. 8.

The configuration 900 is but one example of many potential configurations that can be used to implement the system 100. As such, the examples disclosed herein are not limited to the particular configuration 900 and other configurations are considered to fall within the scope of this disclosure.

Figure 10:
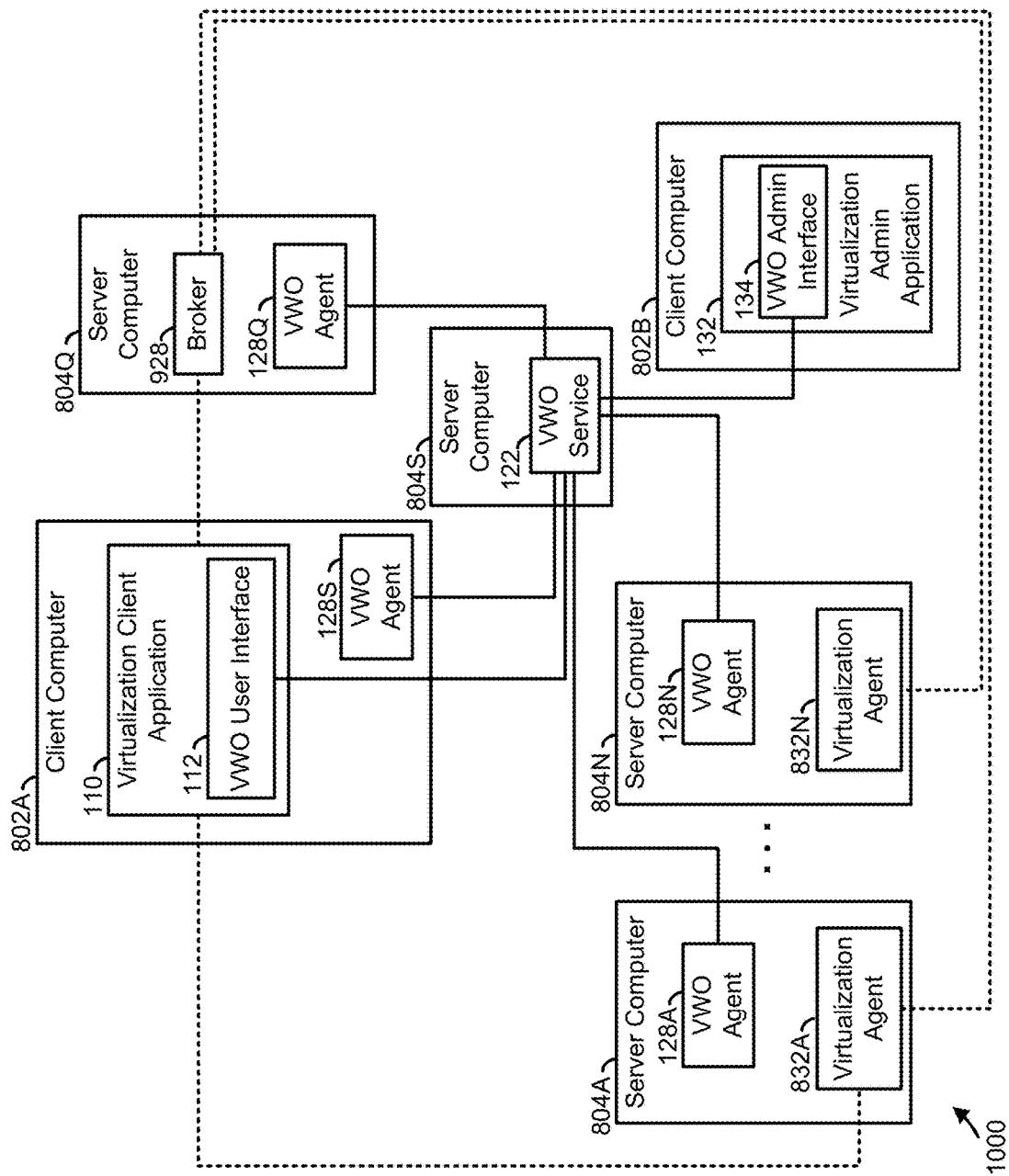
FIG. 10 is a block diagram of the VWO system of FIG. 1 as implemented by another configuration of computing devices in accordance with an example of the present disclosure.

FIG. 10 illustrates a VWO system (e.g., the system 100 of FIG. 1) configured for operation within a distributed computing platform (e.g. the computing platform 700 of FIG. 7). As shown in FIG. 10, the configuration 1000 also implements portions of an on-premises VW system and includes the client computers 802A and 802B and server computers 804A-804S. Within the configuration 1000, the computer systems 802A, 802B, and 804A-804S are communicatively coupled to one another and exchange data via a one or more networks.

As illustrated in FIG. 10, the client computer 802A is configured to host the client application 110 and the VWO agent 128S of FIG. 1. The client computer 802B is configured to host the administrative application 132 of FIG. 1. Examples of the client computers 802A and 802B include the computing platform 700 of FIG. 7. The server computer 804A is configured to host the VWO agent 128A of FIG. 1 and the virtualization agent 832A of FIG. 8. The server computer 804N is configured to host the VWO agent 128N of FIG. 1 and the virtualization agent 832N of FIG. 8. The server computer 804Q is configured to host the VWO agent 128Q of FIG. 1 and the virtual resource broker 928 of FIG. 9. The server computer 804S is configured to host the VWO service 122 of FIG. 1. Examples of the server computers 804A-804S include the computing platform 700 of FIG. 7. Some of the components illustrated in FIG. 10 are described above with reference to FIGS. 1, 2A, 2B, and 8. For purposes of brevity, those descriptions will not be repeated here, but each of these components is configured to function with reference to FIG. 10 as described with reference to its respective figure. The description of these component may be augmented or refined below.

In the example of FIG. 10, VW processes that constitute the on-premises system include the client application 110, the virtualization agents 832A-832N, and the virtual resource broker 928. As shown in FIG. 10, the virtualization agents interoperate with a load balancer (e.g., the broker 928) to register and update the computing resources available for allocation to virtual resources.

As shown in FIG. 10, the client application 110 interoperates with the virtualization agent 832A to provide a user access to virtual resources hosted by the server computer 804A. In some examples, to allocate and connect to virtual resources, the client application 110 interoperates with the broker 928 via APIs implemented by the broker 928. In one such interoperation, the client application 110 requests access to a virtual resource, and the broker 928 identifies connection information for the virtual resource and returns the connection information to the client application 110. In response to receiving the connection information, the client application 110 interoperates with the virtualization agent 832A to establish a connection to the requested virtual resource.

Other VW processes illustrated in FIG. 10 interoperate with one another to prepare for requests for virtual resource. For instance, in some examples, during initialization the virtualization agents 832A-832N interoperate with the broker 928 to register the server computers 804A-804N with the broker 928.

The VWO system illustrated within the context of the configuration 1000 can operate as described with reference to FIG. 8.

The configuration 1000 is but one example of many potential configurations that can be used to implement the system 100. As such, the examples disclosed herein are not limited to the particular configuration 1000 and other configurations are considered to fall within the scope of this disclosure.

Examples of VW System Execution Phases

The system 100 described above can be used to profile and optimize a variety of VW system execution phases. FIGS. 11-15 provide addition detail on at least some of execution phases subject to profiling and optimization by the system 100. It should be noted, however, that the system 100 is not limited in applicable to only the phases described with reference to FIGS. 11-15.

Figure 11:
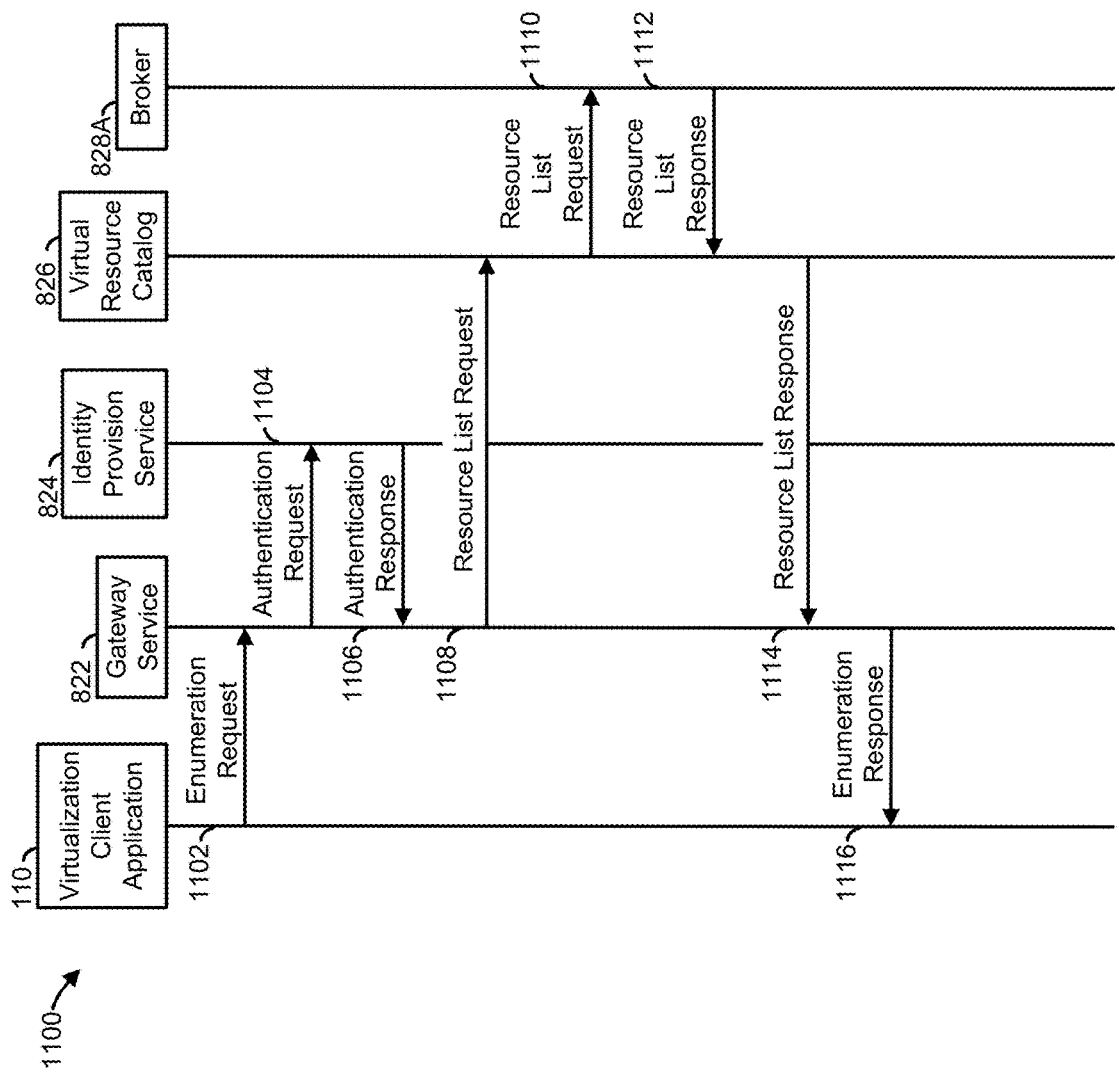
FIG. 11 is a sequence diagram illustrating a virtual resource enumeration phase executed by a VW system in accordance with an example of the present disclosure.

FIG. 11 is a sequence diagram that illustrates a resource enumeration phase 1100 executed by a VW system. As shown in FIG. 11, the phase 1100 is executed by the client application 110 of FIG. 1, the gateway service 822, the identity provision service 824, the virtual resource catalog 826, and the broker 828A of FIG. 8.

The phase 1100 starts with the client application 110 transmitting 1102 a request to the gateway service 822 to enumerate virtual resources available to the client application 110. The gateway service 822 processes the enumeration request to identify access credentials included in the enumeration request and generates and transmits 1104 a request to authenticate the access credentials to the identity provision service 824. The identity provision service 824 processes the authentication request to attempt to authenticate the access credentials and generates and transmits 1106 an authentication response to the gateway service 822. The gateway service 822 processes the authentication response to determine whether the access credentials are authentic and transmits 1108, to the virtual catalog 826, a request to list resources available to the authenticated credentials. The virtual catalog 826 processes the resource list request to transmits 1110 the resource list request to the broker 828A. The broker 828A processes the resource list request to identify resources available to the authenticated credentials and transmits 1112 a response listing the identified resources to the virtual resource catalog 826. The virtual resource catalog 826 processes the resource list response to validate that sufficient computing resources are available to support the available resources and transmits 1114 the resource list response to the gateway service 822. The gateway service 822 processes the resource list response to generate a response to the enumeration request listing the available resources and transmits 1116 the enumeration response to the client application 110, thereby concluding the phase 1100.

Figure 12:
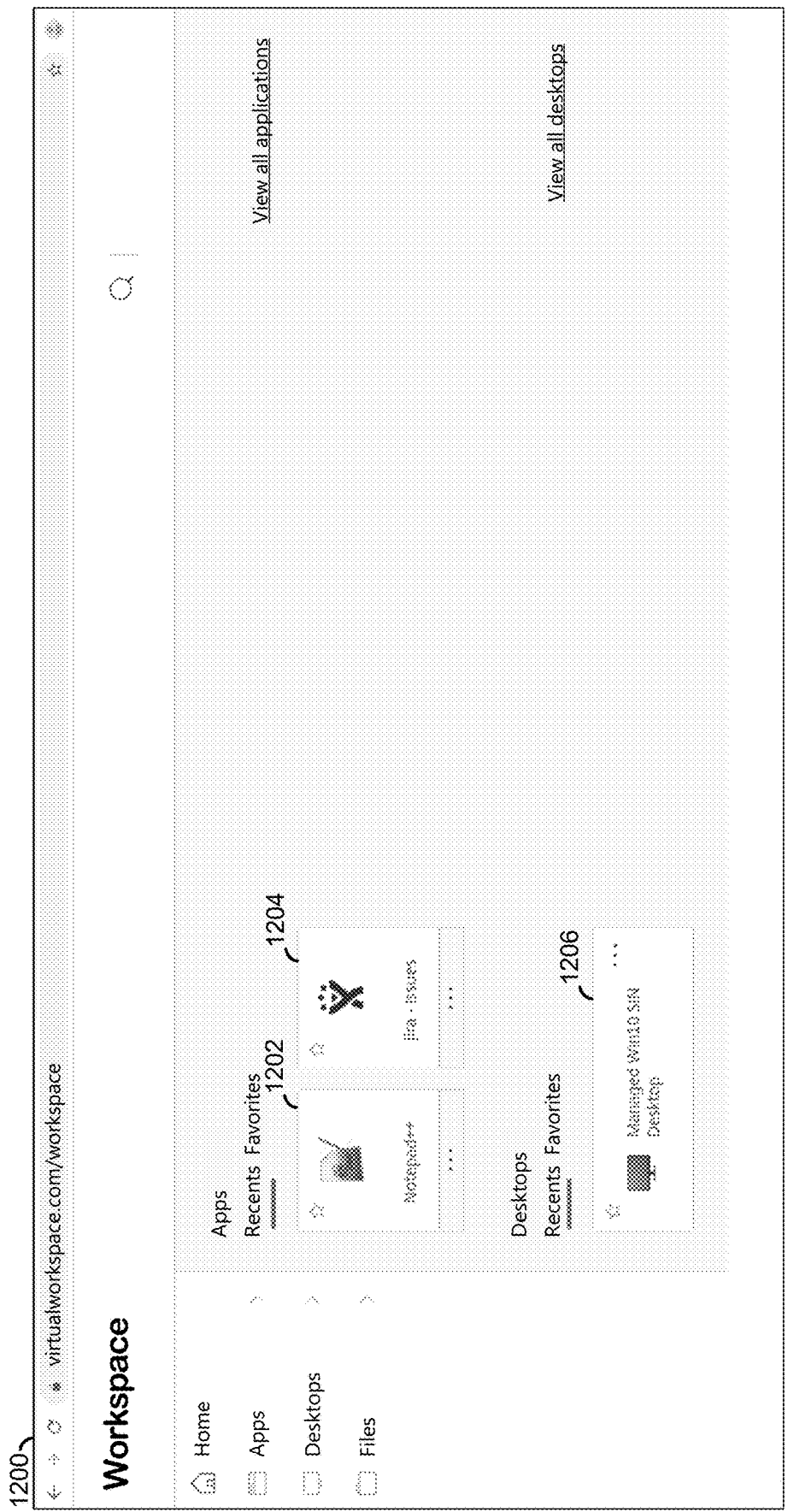
FIG. 12 is a front view of a virtual resources screen provided by a VW system in accordance with an example of the present disclosure.

FIG. 12 illustrates a virtual resources screen 1200 provided by the client application 110 of FIG. 1 upon completion of the enumerate resources phase described above with reference to FIG. 11. As shown in FIG. 12, the resources screen 1200 includes a virtual desktop control 1206 and virtual application controls 1202 and 1204. Each of the virtual resource controls 1202, 1204, and 1206 is selectable to request access to its corresponding virtual resource within the VW system. In response to receiving a selection of any of the resource controls 1202, 1204, and 1206, the VWO user interface initiates a resource allocation phase of VW system execution.

Figure 13:
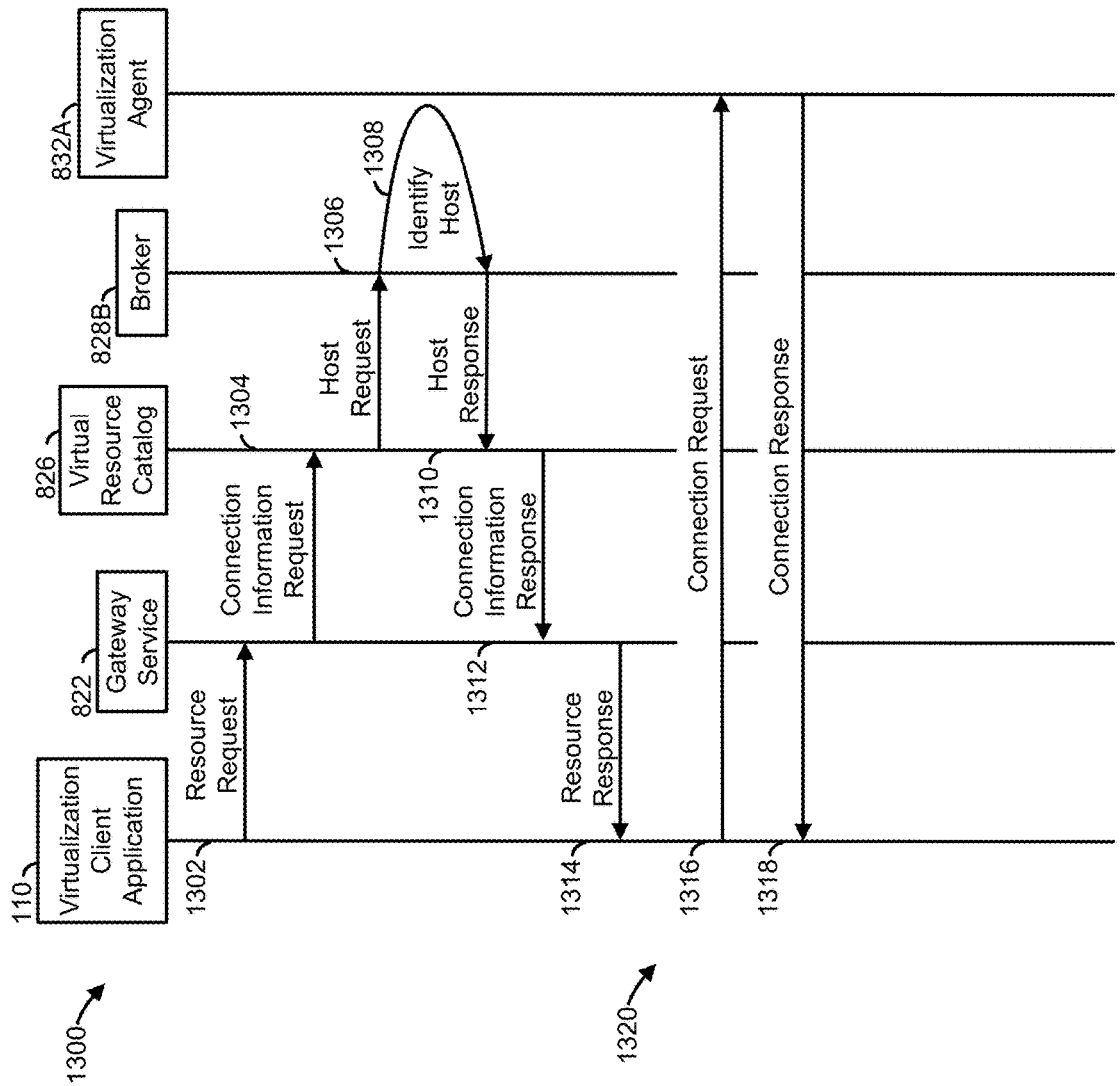
FIG. 13 is a sequence diagram illustrating a virtual resource connection phase executed by a VW system in accordance with an example of the present disclosure.

FIG. 13 is a sequence diagram that illustrates a resource allocation phase 1300 and a resource connection phase 1320 executed by a VW system. As shown in FIG. 13, the phases 1300 and 1320 are executed by the client application 110 of FIG. 1, the gateway service 822, the virtual resource catalog 826, the broker 828A, and the virtualization agent 832A of FIG. 8.

The phase 1300 starts with the client application 110 transmitting 1302 a request message to allocate a virtual resource to the gateway service 822. The gateway service 822 processes the allocation request to generate and transmit 1304 a request for connection information to the virtual resource catalog 826. The virtual catalog 826 processes the connection information request to generate a request for a computing device to host the request virtual resource and transmits 1306 the host request to the broker 828B. The broker 828B processes the host request to identify 1308 a host with sufficient capacity to provide the requested virtual resource and generates and transmits 1310 a response identifying the host to the virtual resource catalog 826. The virtual resource catalog 826 processes the host response to generate a response providing connection information and transmits 1312 the connection information response to the gateway service 822. The gateway service processes the connection information response to generate a response to the resource request that includes connection information needed to connect to the identified host and transmits 1314 the resource response to the client application 110, thereby concluding the phase 1300.

The phase 1320 starts with the client application 110 transmitting 1316 a request message to connect to a host of the virtualization agent 832A. The virtualization agent 832A process the connection request to generate a response to establish a connection with the client application 110 and transmits 1318 the connection response to the client application 110, thereby concluding the phase 1320.

Figure 14:
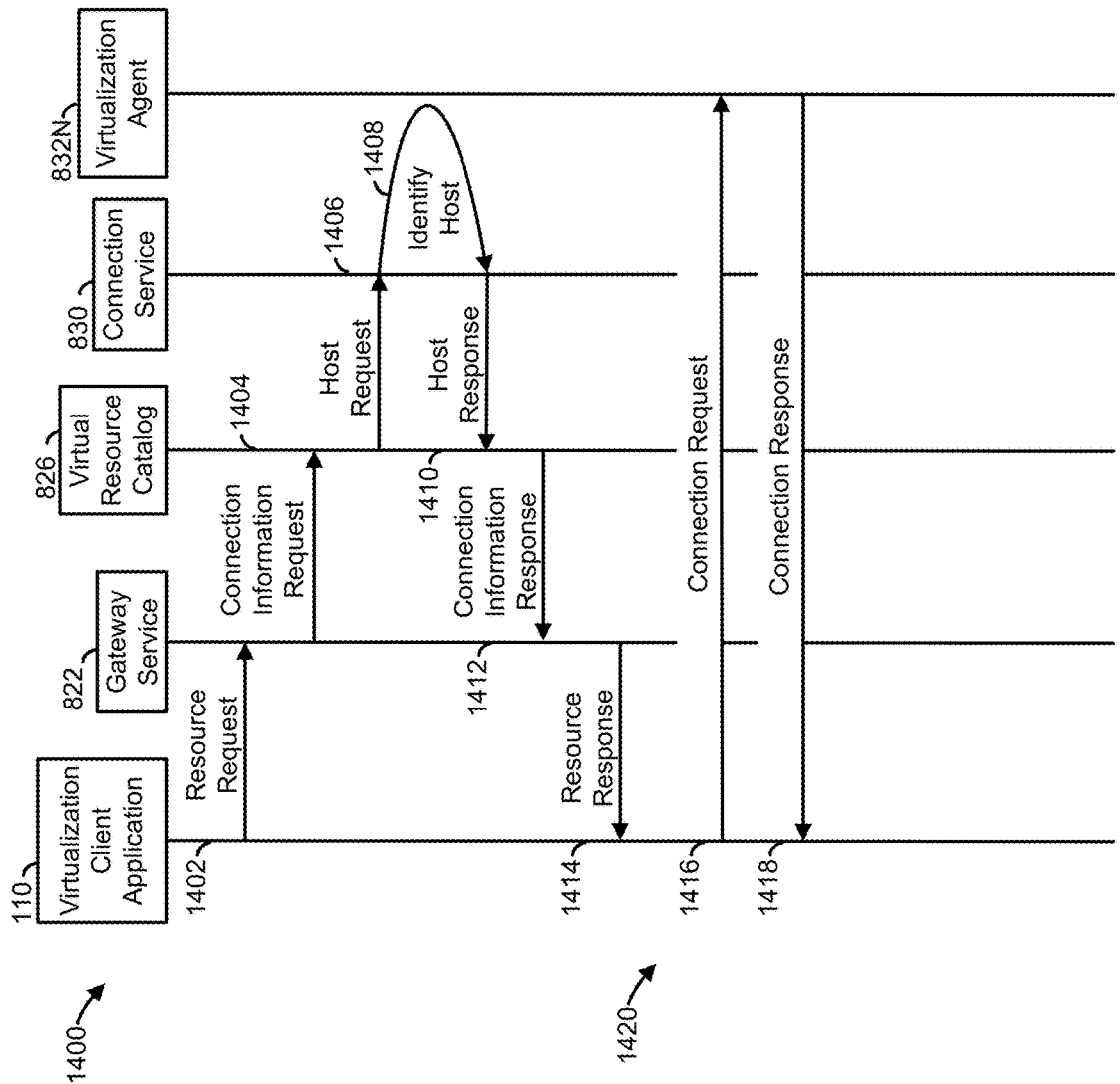
FIG. 14 is a sequence diagram illustrating a virtual resource connection phase executed by another VW system in accordance with an example of the present disclosure.

FIG. 14 is a sequence diagram that illustrates a resource allocation phase 1400 and a resource connection phase 1420 executed by a VW system. As shown in FIG. 14, the phases 1400 and 1422 are executed by the client application 110 of FIG. 1, the gateway service 822, the content switching service 820, the virtual resource catalog 826, the connection service 830, and the virtualization agent 832N of FIG. 8.

The phase 1400 starts with the client application 110 transmitting 1402 a request message to allocate a virtual resource to the gateway service 822. The gateway service 822 processes the allocation request to generate and transmit 1404 a request for connection information to the virtual resource catalog 826. The virtual catalog 826 processes the connection information request to generate a request for a computing device to host the request virtual resource and transmits 1406 the host request to the connection service 830. The connection service processes the host request to identify 1408 a cloud-based host with sufficient capacity to provide the requested virtual resource and generates and transmits 1410 a response identifying the host to the virtual resource catalog 826. The virtual resource catalog 826 processes the host response to generate a response providing connection information and transmits 1412 the connection information response to the gateway service 822. The gateway service processes the connection information response to generate a response to the resource request that includes connection information needed to connect to the identified host and transmits 1414 the resource response to the client application 110, thereby concluding the phase 1400.

The phase 1420 starts with the client application 110 transmitting 1416 a request message to connect to a host of the virtualization agent 832N. The virtualization agent 832N process the connection request to generate a response to establish a connection with the client application 110 and transmits 1418 the connection response to the client application 110, thereby concluding the phase 1420.

Figure 15:
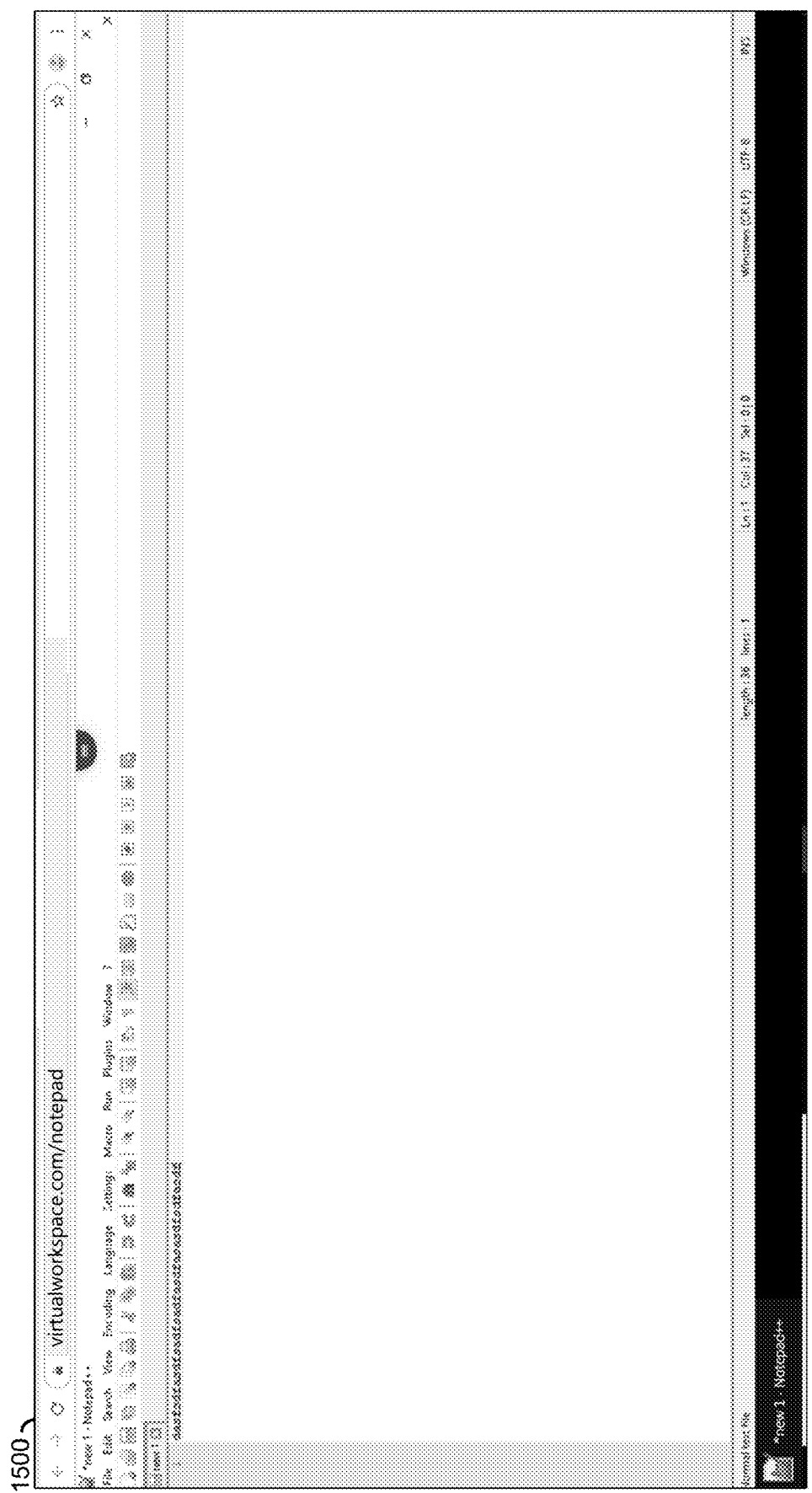
FIG. 15 is a front view of a virtual application screen provided by a VW system in accordance with an example of the present disclosure.

FIG. 15 illustrates a virtual application screen 1500 provided by the client application 110 of FIG. 1 in response to selection of the resource control 1202 and upon completion of the resource allocation phase 1300 and resource connection 1320 phase of FIG. 13 or the resource allocation phase 1400 and resource connection 1420 phase of FIG. 14. As shown in FIG. 15, a user can access a virtual instance of Notepad++ hosted on either the server computer 804A or the server computer 804N of FIG. 8.

Additional Examples

Descriptions of additional examples follow. Other variations will be apparent in light of this disclosure.

Example 1 is a computer system comprising a memory storing a plurality of event log entries, each event log entry of the plurality of event log entries including an identifier of an event and a timestamp at which the event occurred; at least one network interface; and at least one processor coupled to the memory and the at least one network interface and configured to receive, via the at least one network interface, a request to profile one or more phases of a distributed process executed by a plurality of hosts coupled to one another via a network, each of the one or more phases comprising a plurality of operations executed by a plurality of processes hosted by the plurality of hosts, each of the one or more phases either starting with receipt of a request via a user interface of a virtualization client application or ending with provision of a response to the request via the user interface of the virtualization client application, identify two or more event log entries within the plurality of event log entries that each include an identifier of an event marking one or more of a start and an end of one of the plurality of operations, construct a performance profile based on the two or more event log entries, and transmit the performance profile to the virtualization client application for rendering via the user interface of the virtualization client application.

Example 2 includes the subject matter of Example 1, wherein the one or more phases comprise a virtual resource enumeration phase, the plurality of processes comprises the virtualization client application and a virtual resource broker, and to identify the two or more event log entries includes to identify a first event log entry marking reception of input via the user interface requesting a list of one or more virtual resources accessible via the virtualization client application, and a second event log entry marking rendering of the list via the user interface.

Example 3 includes the subject matter of either Example 1 or Example 2, wherein the one or more phases comprise a virtual resource allocation phase and a virtual resource connection phase, the plurality of processes comprises the virtualization client application, the virtual resource broker, and a virtualization agent, and to identify the two or more event log entries includes to identify a first event log entry marking reception of input via the user interface requesting access to at least one virtual resource in the list, and a second event log entry marking rendering of a representation of the at least one virtual resource via the user interface.

Example 4 includes the subject matter of any of Example 1 through Example 3, wherein the at least one virtual resource is one or more of a virtual desktop, a virtual application, and virtual data storage.

Example 5 includes the subject matter of any of Examples 2 through 4, wherein the one or more phases comprise a virtual resource allocation phase and a virtual resource connection phase, the plurality of processes comprises the virtualization client application, a gateway service, an identity provisioning service, a content switching service, a connection service, and a virtualization agent and to identify the two or more event log entries includes to identify a first event log entry marking reception of input via the user interface requesting access to at least one virtual resource in the list, the at least one virtual resource being hosted by a multi-tenant cloud service, and a second event log entry marking rendering of a representation of the at least one virtual resource via the user interface.

Example 6 includes the subject matter of any of Examples 1 through 5, wherein the at least one processor is further configured to display a visualization of the performance profile via the user interface, the visualization comprising an indication of a difference between timestamps stored in the two or more event log entries.

Example 7 includes the subject matter of any of Examples 1 through 6, wherein the at least one processor is further configured to display a visualization of the performance profile via the user interface, the visualization comprising a list of durations of execution of each operation of the plurality of operations.

Example 8 includes the subject matter of any of Examples 1 through 7, wherein the at least one processor is further configured to display a visualization of the performance profile via the user interface, the visualization comprising a list of durations of execution of each of the one or more phases.

Example 9 includes the subject matter of any of Examples 1 through 9, wherein the at least one processor is further configured to receive a request to improve performance of at least one process of the plurality of processes; identify at least one enhancement available for the at least one process; and initiate deployment of the at least one enhancement to the at least one process.

Example 10 includes the subject matter of Example 9, wherein the memory stores parameters of a machine learning process trained to identify the at least one enhancement by processing features descriptive of a virtual workspace system comprising the virtualization client application and to identify the at least one enhancement comprises to execute the machine learning process using the parameters and the features.

Example 11 includes the subject matter of either Example 9 or Example 10, wherein the at least one process comprises the virtualization client application, the at least one enhancement comprises a template of configuration information, and to initiate deployment of the at least one enhancement comprises to replace configuration information of the virtualization client application with the template.

Example 12 includes the subject matter of Example 11, wherein the at least one processor is further configured to display, via the user interface, a confirmation of the deployment of the at least one enhancement.

Example 13 includes the subject matter of any of Examples 9 through 12, wherein the at least one process comprises one or more of a virtualization agent and a connection service, the at least one enhancement comprises a template of configuration information, and to initiate deployment of the at least one enhancement comprises to transmit a notification to an administrator of the virtualization agent or the connection service, the notification comprising a prompt to the administrator to replace configuration information of the one or more of the virtualization agent and the connection service with the template.

Example 14 includes the subject matter of any of Examples 9 through 13, wherein the at least one process comprises one or more of a gateway service, an identify provision service, a content switching service, a virtual workspace service, and a content switching service, the at least one enhancement comprises one or more of a patch and a cache setting, and to initiate deployment of the at least one enhancement comprises to transmit a notification to an administrator of the gateway service, the identity provision service, the content switching service, the virtual workspace service, and the content switching service, the notification comprising a prompt to the administrator to deploy one or more of the patch and the cache setting.

Example 15 is method of tracking and enhancing performance of a virtual workspace system using a computer system comprising a memory, at least one network interface, and at least one processor coupled to the memory and the at least one network interface, the memory storing a plurality of event log entries, each event log entry of the plurality of event log entries including an identifier of an event and a timestamp at which the event occurred, the method comprising receiving, via the at least one network interface, a request to profile one or more phases of a distributed process executed by a plurality of hosts coupled to one another via a network, each of the one or more phases comprising a plurality of operations executed by a plurality of processes hosted by the plurality of hosts, each of the one or more phases either starting with receipt of a request via a user interface of a virtualization client application or ending with provision of a response to the request via the user interface of the virtualization client application; identifying two or more event log entries within the plurality of event log entries that each include an identifier of an event marking one or more of a start and an end of one of the plurality of operations; constructing a performance profile based on the two or more event log entries; and transmitting the performance profile to the virtualization client application for rendering via the user interface of the virtualization client application.

Example 16 includes the subject matter of Example 15, further comprising receiving a request to improve performance of at least one process of the plurality of processes; identifying at least one enhancement available for the at least one process; and initiating deployment of the at least one enhancement to the at least one process.

Example 17 includes the subject matter of either Example 15 or Example 16, wherein the at least one process comprises the virtualization client application, the at least one enhancement comprises a template of configuration information, and initiating deployment of the at least one enhancement comprises replacing configuration information of the virtualization client application with the template.

Example 18 is a non-transitory computer readable medium storing processor executable instructions to track and enhance performance of a virtual workspace system, the instructions comprising instructions to receive, via at least one network interface, a request to profile one or more phases of a distributed process executed by a plurality of hosts coupled to one another via a network, each of the one or more phases comprising a plurality of operations executed by a plurality of processes hosted by the plurality of hosts, each of the one or more phases either starting with receipt of a request via a user interface of a virtualization client application or ending with provision of a response to the request via the user interface of the virtualization client application; identify two or more event log entries within a plurality of event log entries that each include an identifier of an event marking one or more of a start and an end of one of the plurality of operations; construct a performance profile based on the two or more event log entries; and transmit the performance profile to the virtualization client application for rendering via the user interface of the virtualization client application.

Example 19 includes the subject matter of Example 18, wherein the instructions further comprise instructions to receive a request to improve performance of at least one process of the plurality of processes; identify at least one enhancement available for the at least one process; and initiate deployment of the at least one enhancement to the at least one process.

Example 20 includes the subject matter of either Example 18 or Example 19, wherein the at least one process comprises the virtualization client application, the at least one enhancement comprises a template of configuration information, and the instructions to initiate deployment of the at least one enhancement comprise instructions to replace configuration information of the virtualization client application with the template.

Having thus described several aspects of at least one example, it is to be appreciated that various alterations, modifications, and improvements will readily occur to those skilled in the art. For instance, examples disclosed herein can also be used in other contexts. Such alterations, modifications, and improvements are intended to be part of this disclosure and are intended to be within the scope of the examples discussed herein. Accordingly, the foregoing description and drawings are by way of example only.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

The invention claimed is:

1. A computer system comprising:
a memory storing a plurality of event log entries, each event log entry of the plurality of event log entries including an identifier of an event and a timestamp at which the event occurred;
at least one network interface; and
at least one processor coupled to the memory and the at least one network interface and configured to
receive, via the at least one network interface, a request to profile one or more phases of a distributed process executed by a plurality of hosts coupled to one another via a network, each of the one or more phases comprising a plurality of operations executed by a plurality of processes hosted by the plurality of hosts, each of the one or more phases either starting with receipt of a request via a user interface of a virtualization client application or ending with provision of a response to the request via the user interface of the virtualization client application,
identify two or more event log entries within the plurality of event log entries that each include an identifier of an event marking one or more of a start and an end of one of the plurality of operations,
construct a performance profile based on the two or more event log entries,
transmit the performance profile to the virtualization client application for rendering via the user interface of the virtualization client application,
receive a request to improve performance of at least one process of the plurality of processes,
identify at least one enhancement available for the at least one process, and
initiate deployment of the at least one enhancement to the at least one process, wherein the at least one process comprises the virtualization client application, the at least one enhancement comprises a template of configuration information, and to initiate deployment of the at least one enhancement comprises to replace configuration information of the virtualization client application with the template.

2. The computer system of claim 1, wherein the one or more phases comprise a virtual resource enumeration phase, the plurality of processes comprises the virtualization client application and a virtual resource broker, and to identify the two or more event log entries includes to identify
a first event log entry marking reception of input via the user interface requesting a list of one or more virtual resources accessible via the virtualization client application, and
a second event log entry marking rendering of the list via the user interface.

3. The computer system of claim 2, wherein the one or more phases comprise a virtual resource allocation phase and a virtual resource connection phase, the plurality of processes comprises the virtualization client application, the virtual resource broker, and a virtualization agent, and to identify the two or more event log entries includes to identify
a first event log entry marking reception of input via the user interface requesting access to at least one virtual resource in the list, and
a second event log entry marking rendering of a representation of the at least one virtual resource via the user interface.

4. The computer system of claim 3, wherein the at least one virtual resource is one or more of a virtual desktop, a virtual application, and virtual data storage.

5. The computer system of claim 2, wherein the one or more phases comprise a virtual resource allocation phase and a virtual resource connection phase, the plurality of processes comprises the virtualization client application, a gateway service, an identity provisioning service, a content switching service, a connection service, and a virtualization agent and to identify the two or more event log entries includes to identify
a first event log entry marking reception of input via the user interface requesting access to at least one virtual resource in the list, the at least one virtual resource being hosted by a multi-tenant cloud service, and a second event log entry marking rendering of a representation of the at least one virtual resource via the user interface.

6. The computer system of claim 1, wherein the at least one processor is further configured to display a visualization of the performance profile via the user interface, the visualization comprising an indication of a difference between timestamps stored in the two or more event log entries.

7. The computer system of claim 1, wherein the at least one processor is further configured to display a visualization of the performance profile via the user interface, the visualization comprising a list of durations of execution of each operation of the plurality of operations.

8. The computer system of claim 1, wherein the at least one processor is further configured to display a visualization of the performance profile via the user interface, the visualization comprising a list of durations of execution of each of the one or more phases.

9. The computer system of claim 1, wherein the memory stores parameters of a machine learning process trained to identify the at least one enhancement by processing features descriptive of a virtual workspace system comprising the virtualization client application and to identify the at least one enhancement comprises to execute the machine learning process using the parameters and the features.

10. The computer system of claim 1, wherein the at least one processor is further configured to display, via the user interface, a confirmation of the deployment of the at least one enhancement.

11. The computer system of claim 1, wherein the at least one process comprises one or more of a virtualization agent and a connection service, the at least one enhancement comprises a template of configuration information, and to initiate deployment of the at least one enhancement comprises to transmit a notification to an administrator of the virtualization agent or the connection service, the notification comprising a prompt to the administrator to replace configuration information of the one or more of the virtualization agent and the connection service with the template.

12. The computer system of claim 1, wherein the at least one process comprises one or more of a gateway service, an identify provision service, a content switching service, a virtual workspace service, and a content switching service, the at least one enhancement comprises one or more of a patch and a cache setting, and to initiate deployment of the at least one enhancement comprises to transmit a notification to an administrator of the gateway service, the identity provision service, the content switching service, the virtual workspace service, and the content switching service, the notification comprising a prompt to the administrator to deploy one or more of the patch and the cache setting.

13. A method of tracking and enhancing performance of a virtual workspace system using a computer system comprising a memory, at least one network interface, and at least one processor coupled to the memory and the at least one network interface, the memory storing a plurality of event log entries, each event log entry of the plurality of event log entries including an identifier of an event and a timestamp at which the event occurred, the method comprising:

receiving, via the at least one network interface, a request to profile one or more phases of a distributed process executed by a plurality of hosts coupled to one another via a network, each of the one or more phases comprising a plurality of operations executed by a plurality of processes hosted by the plurality of hosts, each of the one or more phases either starting with receipt of a request via a user interface of a virtualization client application or ending with provision of a response to the request via the user interface of the virtualization client application;

identifying two or more event log entries within the plurality of event log entries that each include an identifier of an event marking one or more of a start and an end of one of the plurality of operations;

constructing a performance profile based on the two or more event log entries;

transmitting the performance profile to the virtualization client application for rendering via the user interface of the virtualization client application;

receiving a request to improve performance of at least one process of the plurality of processes;

identifying at least one enhancement available for the at least one process; and initiating deployment of the at least one enhancement to the at least one process, wherein the at least one process comprises the virtualization client application, the at least one enhancement comprises a template of configuration information, and initiating deployment of the at least one enhancement comprises replacing configuration information of the virtualization client application with the template.

14. A non-transitory computer readable medium storing processor executable instructions to track and enhance performance of a virtual workspace system, the instructions comprising instructions to:

receive, via at least one network interface, a request to profile one or more phases of a distributed process executed by a plurality of hosts coupled to one another via a network, each of the one or more phases comprising a plurality of operations executed by a plurality of processes hosted by the plurality of hosts, each of the one or more phases either starting with receipt of a request via a user interface of a virtualization client application or ending with provision of a response to the request via the user interface of the virtualization client application;

identify two or more event log entries within a plurality of event log entries that each include an identifier of an event marking one or more of a start and an end of one of the plurality of operations;

construct a performance profile based on the two or more event log entries;

transmit the performance profile to the virtualization client application for rendering via the user interface of the virtualization client application;

receive a request to improve performance of at least one process of the plurality of processes;

identify at least one enhancement available for the at least one process; and initiate deployment of the at least one enhancement to the at least one process, wherein the at least one process comprises the virtualization client application, the at least one enhancement comprises a template of configuration information, and the instructions to initiate deployment of the at least one enhancement comprise instructions to replace configuration information of the virtualization client application with the template.

* * * * *